US012394563B2

(12) United States Patent
Kuriyama

(10) Patent No.: US 12,394,563 B2
(45) Date of Patent: *Aug. 19, 2025

(54) METHOD OF PRODUCING ALLOY STRIP LAMINATE AND APPARATUS FOR PRODUCING ALLOY STRIP LAMINATE

(71) Applicant: Proterial, Ltd., Tokyo (JP)

(72) Inventor: Yasuo Kuriyama, Tokyo (JP)

(73) Assignee: Proterial, Ltd., Tokyo (JP)

( * ) Notice: Subject to any disclaimer, the term of this patent is extended or adjusted under 35 U.S.C. 154(b) by 640 days.

This patent is subject to a terminal disclaimer.

(21) Appl. No.: 17/612,766

(22) PCT Filed: May 21, 2020

(86) PCT No.: PCT/JP2020/020158
§ 371 (c)(1),
(2) Date: Nov. 19, 2021

(87) PCT Pub. No.: WO2020/235642
PCT Pub. Date: Nov. 26, 2020

(65) Prior Publication Data
US 2022/0298593 A1   Sep. 22, 2022

(30) Foreign Application Priority Data

May 21, 2019 (JP) .................................. 2019-095278
May 21, 2019 (JP) .................................. 2019-095279

(51) Int. Cl.
*H01F 41/02* (2006.01)
*B32B 37/06* (2006.01)
(Continued)

(52) U.S. Cl.
CPC ............. *H01F 41/02* (2013.01); *B32B 37/06* (2013.01); *C09J 7/40* (2018.01); *C21D 1/26* (2013.01);
(Continued)

(58) Field of Classification Search
CPC . B32B 37/06; H01F 41/0213; H01F 41/0226; H01F 41/02; H01F 1/15333;
(Continued)

(56) References Cited

U.S. PATENT DOCUMENTS 6,031,341 A   2/2000 Yoshizawa et al.
6,830,634 B2  12/2004 Herzer et al.
(Continued)

FOREIGN PATENT DOCUMENTS

CN          1659289 A    8/2005
CN        101351571 A    1/2009
(Continued)

OTHER PUBLICATIONS

Machine translation of CN 107742575 date unknown.*
(Continued)

*Primary Examiner* — John L Goff, II
(74) *Attorney, Agent, or Firm* — Westman, Champlin & Koehler, P.A.

(57) ABSTRACT

This disclosure provides a method of producing an alloy strip laminate including applying an external force directly to an alloy strip of a first laminate member having an adhesive layer and the alloy strip, to form a crack in the alloy strip and prepare a first laminate including the adhesive layer and the cracked alloy strip, applying an external force directly to an alloy strip of a second laminate member having an adhesive layer and the alloy strip, to form a crack in the alloy strip and prepare at least one second laminate including the adhesive layer and the cracked alloy strip, and laminating the at least one second laminate on the first laminate to prepare an alloy strip laminate in which the adhesive layer, and the alloy strip with the crack formed are alternately layered; and a production apparatus for an alloy strip laminate.

22 Claims, 17 Drawing Sheets

(51) Int. Cl.
  *C09J 7/40* (2018.01)
  *C21D 1/26* (2006.01)
  *C21D 8/02* (2006.01)
  *H01F 1/147* (2006.01)
  *H01F 1/153* (2006.01)

(52) U.S. Cl.
  CPC ......... *C21D 8/0205* (2013.01); *C21D 8/0221* (2013.01); *C21D 8/0252* (2013.01); *C21D 8/0278* (2013.01); *H01F 1/14716* (2013.01); *H01F 1/15333* (2013.01); *H01F 1/15375* (2013.01); *H01F 1/15383* (2013.01); *H01F 41/024* (2013.01); *C21D 2201/03* (2013.01)

(58) Field of Classification Search
  CPC ....... H01F 1/02; C21D 8/0221; C21D 8/0252; C21D 8/0278; C09J 7/40
  USPC .......................................... 156/162, 164, 184
  See application file for complete search history.

(56) References Cited

U.S. PATENT DOCUMENTS

| | | |
|---|---|---|
| 7,905,966 B2 | 3/2011 | Waeckerle et al. |
| 8,083,867 B2 | 12/2011 | Yoshizawa et al. |
| 9,252,611 B2 | 2/2016 | Lee et al. |
| 9,504,194 B2 | 11/2016 | Lee et al. |
| 9,930,818 B2 | 3/2018 | Lee et al. |
| 10,010,018 B2 | 6/2018 | Lee et al. |
| 10,014,724 B2 | 7/2018 | Riehl et al. |
| 10,020,104 B2 | 7/2018 | Watanabe et al. |
| 10,123,467 B2 | 11/2018 | Lee et al. |
| 11,006,553 B2 | 5/2021 | Lee et al. |
| 11,322,281 B2 | 5/2022 | Ohta |
| 2003/0226618 A1 | 12/2003 | Herzer et al. |
| 2008/0196795 A1 | 8/2008 | Waeckerle et al. |
| 2009/0065100 A1 | 3/2009 | Yoshizawa et al. |
| 2014/0246923 A1 | 9/2014 | Riehl et al. |
| 2014/0362505 A1 | 12/2014 | Jang et al. |
| 2015/0123604 A1 | 5/2015 | Lee et al. |
| 2016/0055952 A1 | 2/2016 | Watanabe et al. |
| 2016/0081237 A1 | 3/2016 | Lee et al. |
| 2016/0081238 A1 | 3/2016 | Lee et al. |
| 2016/0081239 A1 | 3/2016 | Lee et al. |
| 2016/0081240 A1 | 3/2016 | Lee et al. |
| 2019/0045676 A1 | 2/2019 | Lee et al. |
| 2019/0074115 A1 | 3/2019 | Ohta |
| 2021/0185865 A1 | 6/2021 | Lee et al. |

FOREIGN PATENT DOCUMENTS

| | | | |
|---|---|---|---|
| CN | 101371321 A | 2/2009 | |
| CN | 104376950 A | 2/2015 | |
| CN | 104900383 A | 9/2015 | |
| CN | 105074838 A | 11/2015 | |
| CN | 105074848 A | 11/2015 | |
| CN | 105593382 A | 5/2016 | |
| CN | 105632678 A | 6/2016 | |
| CN | 107742575 A * | 2/2018 | ............ B32B 37/10 |
| CN | 108701530 A | 10/2018 | |
| CN | 109716463 A | 5/2019 | |
| EP | 3050977 A1 | 8/2016 | |
| FR | 2823507 A1 | 10/2002 | |
| JP | S61227156 A | 10/1986 | |
| JP | 2004160513 A | 6/2004 | |
| JP | 2005529233 A | 9/2005 | |
| JP | 2008112830 A | 5/2008 | |
| JP | 2011134959 A | 7/2011 | |
| JP | 2015505166 A | 2/2015 | |
| JP | 2019095278 A | 6/2019 | |
| JP | 2019095279 A | 6/2019 | |
| KR | 101889226 B1 | 8/2018 | |
| TW | 201804006 A | 2/2018 | |
| WO | 2014157526 A1 | 10/2014 | |
| WO | 2015046140 A1 | 4/2015 | |
| WO | 2018062310 A1 | 4/2018 | |

OTHER PUBLICATIONS

Machine translation of CN 105632678 date unknown.*
International Search Report and Written Opinion for International Application No. PCT/JP2020/020158, dated Aug. 4, 2020, 9 pages.
Decision of Refusal for Japanese Patent Application No. 2021-520850, drafted Feb. 16, 2023, 6 pages.
First Office Action, including Search Report, for Chinese Patent Application No. 202080031374.3, dated Mar. 31, 2023, 20 pages.
International Search Report and Written Opinion for International Application No. PCT/JP2020/020159, dated Aug. 14, 2020, 9 pages.
Office Action, including Search Report, for Chinese Patent Application No. 202080030755.X, dated Feb. 17, 2023, 14 pages.
Office Action, including Search Report, for Taiwanese Patent Application No. 109116966, dated Apr. 26, 2023, 9 pages.
Non-Final Rejection for U.S. Appl. No. 17/612,763, mailed Aug. 25, 2023, 19 pages.
Third Office Action, including Search Report, for Chinese Patent Application No. 202080031374.3, dated Dec. 21, 2023, 14 pages.
Office Action, including Search Report, for Taiwanese Patent Application No. 109116967, dated Aug. 24, 2023, 11 pages.
Final Rejection for U.S. Appl. No. 17/612,763, mailed Feb. 23, 2024, 14 pages.
Second Office Action, including Search Report, for Chinese Patent Application No. 202080031374.3, dated Jul. 29, 2023, 18 pages.
Notice of Reasons for Refusal for Japanese Patent Application No. 2021-520850, drafted Aug. 31, 2022, 6 pages.
Decision of Refusal, for Chinese Patent Application No. 202080031374.3, dated Mar. 23, 2024, 22 pages.
Japanese Notice of Reasons for Refusal, for Japanese Patent Application No. 2023-083520, dated Jul. 2, 2024, 6 pages.

* cited by examiner

FIG.7
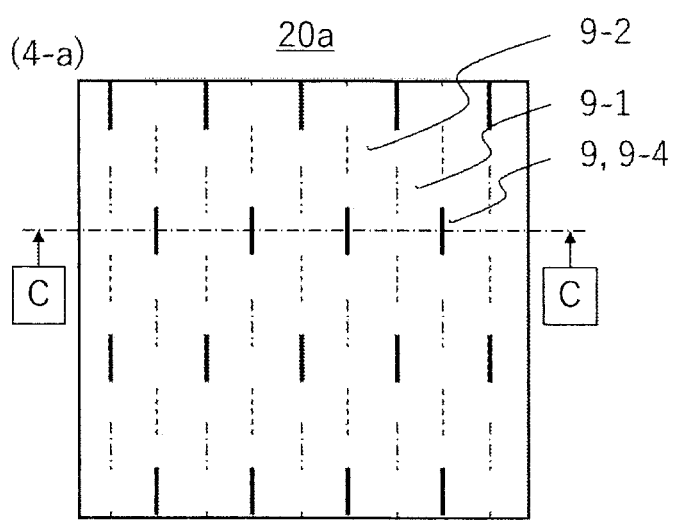
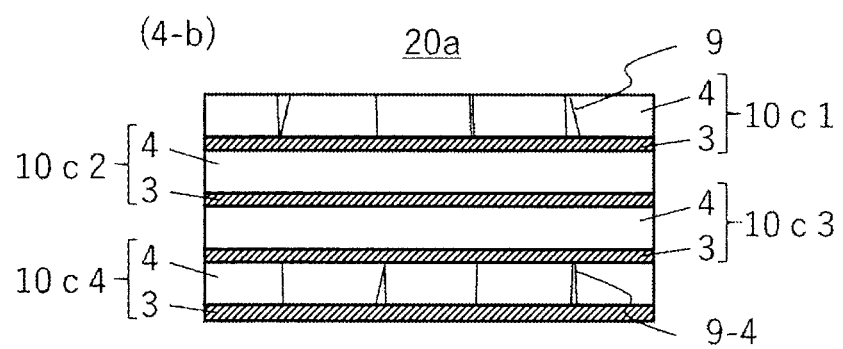

FIG.9
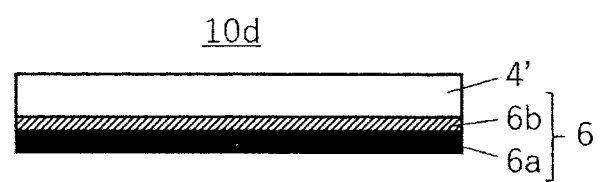
FIG.10
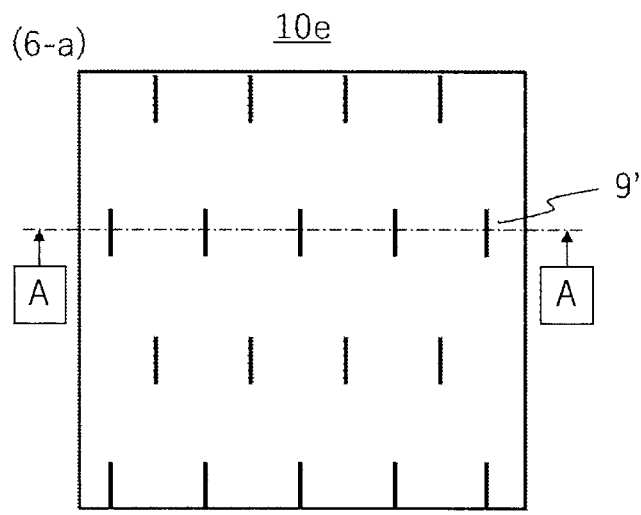
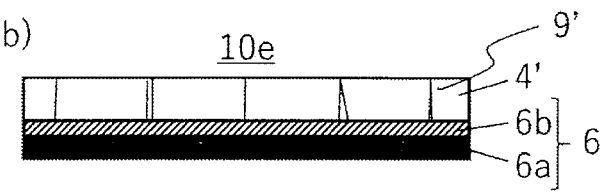

FIG.11
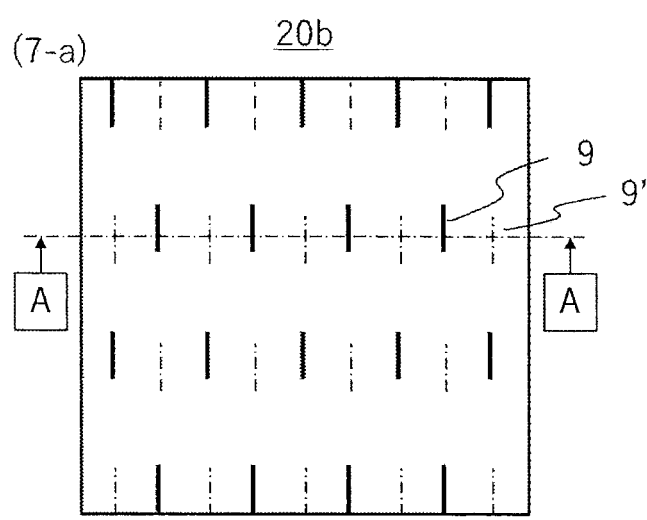
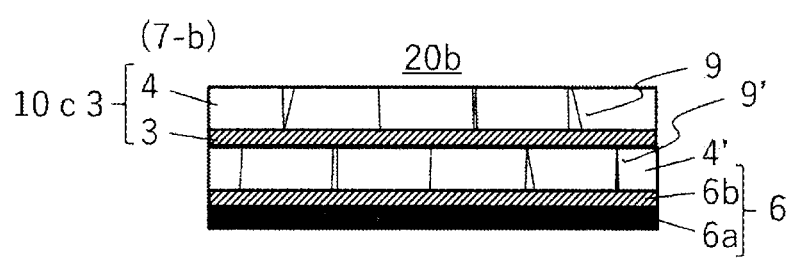

METHOD OF PRODUCING ALLOY STRIP LAMINATE AND APPARATUS FOR PRODUCING ALLOY STRIP LAMINATE

CROSS REFERENCE TO RELATED APPLICATIONS

This application is a National Stage of International Application No. PCT/JP2020/020158, filed May 21, 2020, which claims priority under 35 U.S.C. § 119 (a) to Japanese Patent Application Nos. 2019-095278 and 2019-095279, each filed May 21, 2019. Each of the above applications is hereby expressly incorporated by reference, in its entirety, into the present application.

TECHNICAL FIELD

The present disclosure relates to a method of producing an alloy strip laminate and an apparatus for producing an alloy strip laminate.

BACKGROUND ART

Electronic devices such as smart phones, tablet type information terminals, and cell phones have rapidly become commonplace in recent years. In particular, cell phones (for example, smart phones), web terminals, music players, and the like are required to be continuously usable over a long time period for convenience as portable devices. In these small portable devices, a secondary battery such as a lithium ion battery is used as a power source. Charging methods for the secondary battery, include a wired charging method in which charging is performed by bringing a power receiving-side electrode and a power supply-side electrode into direct contact, and a wireless charging method in which transmission coils are provided at both the power supply side and the power receiving side and charging is performed by electric power transmission utilizing electromagnetic induction. Since it is not necessary to bring the power supply device and the power receiving device into direct contact in the case of a wireless charging method, it is possible to charge different power receiving devices using the same power supply device. The wireless charging method is a technology that can be used not only in portable devices but also in other electronic devices, electric vehicles, drones, and the like.

In the wireless charging method, the magnetic flux generated in the primary transmission coil of the power supply device generates an electromotive force in the secondary transmission coil of the power receiving device through the housings of the power supply device and the power receiving device, whereby electric supply is performed. In order to obtain a high electric power transmission efficiency, a magnetic sheet is provided as a coil yoke on the opposite side of the contact plane between the power supply device and the power receiving device with respect to the transmission coil. This kind of magnetic sheet has the following roles.

The first role is a role as a magnetic shielding material. For example, when a leakage flux generated during a charging operation of a wireless charging device flows into another component such as a metal member configuring a secondary battery, the component generates heat due to an eddy current. The magnetic sheet can suppress this heat generation in its role as a magnetic shielding material.

The second role of a magnetic sheet is an action as a yoke member that recirculates the magnetic flux generated by the coil when charging a battery.

Conventionally, a ferrite material has been commonly used for the soft magnetic material used for the magnetic sheet of a wireless charging device; however, recently, an alloy strip made of a soft magnetic material such as an amorphous alloy or a nanocrystalline alloy has started to be applied, as described in Japanese Patent Application Laid-Open (JP-A) No. 2008-112830.

JP-A No. 2008-112830 discloses a method of producing a magnetic sheet including a step of forming a magnetic sheet by bonding a sheet-like magnetic material (alloy strip) onto a sheet substrate via the intermediary of an adhesive layer, and a step of dividing the alloy strip into plural pieces by an external force in order to improve the Q value or to reduce the eddy current loss while maintaining a state in which the alloy strip is bonded to the sheet substrate. JP-A No. 2008-112830 also discloses that when a magnetic sheet is used, for example, as a magnetic material for an inductor, the Q value can be improved by applying an external force to an alloy strip to divide it into plural pieces. Further, JP-A No. 2008-112830 discloses that when a magnetic sheet is used as a magnetic material for magnetic shield, the eddy current loss can be reduced by dividing the current path of the alloy strip. Moreover, JP-A No. 2008-112830 discloses that when the alloy strip is divided into plural pieces, the area of a divided piece is preferably from 0.01 $mm^2$ to 25 $mm^2$.

Further, Japanese National-Phase Publication (JP-A) No. 2015-505166 discloses, as an example, a method of producing a magnetic sheet applying the following two steps: (1) a step of forming a laminate sheet by sticking a protective film and a double-faced adhesive tape provided with a release film on its exposed surfaces to both sides of a thin film magnetic sheet (alloy strip) made of at least one layer of amorphous ribbon, and (2) a step of dividing the alloy strip into a large number of small pieces by subjecting the laminate sheet to a flaking treatment.

Further, as a subsequent step, (3) a step of further laminating the above-described laminate sheet that has been subjected to flaking treatment and flattening and streamlining the laminate sheet, and at the same time, filling the gaps between the large number of small pieces with parts of first and second adhesive layers disposed on the protective film and double-faced adhesive tape in order to effect isolation, is disclosed. Via the step (3), the sheet is flattened and streamlined.

SUMMARY OF INVENTION

Technical Problem

When a magnetic sheet using plural divided alloy strips is applied to a wireless charging device, the magnetic permeability is frequently used as a representative magnetic property for quantifying the division state. Usually, a magnetic sheet having an alternating current relative magnetic permeability μr at 128 kHz of from 100 to 2000 is required. In order to obtain a magnetic sheet having this magnetic permeability value, it is necessary to finely divide the alloy strip at intervals of about 1 mm.

However, when an internal alloy strip is to be finely divided into plural pieces by applying an external force through a resin film as in JP-A No. 2015-505166, since the resin film of the magnetic sheet has a large elasticity, the alloy strip cannot be finely divided when the applied external force is small. On the other hand, when the applied external force is large enough to divide the alloy strip into small pieces, roughness will remain on the surface of the resin film or alloy strip. In such a case, the roughness of the alloy strip may be deformed or the intervals between the plural divided pieces of the strip may be changed due to the elasticity of the resin film in the magnetic sheet. As a result, the alternating current relative magnetic permeability μr gradually changes over time. Therefore, the alternating current relative magnetic permeability μr at the time of mass production may differ from that of the magnetic sheet mounted on an electronic device. As a result, there arises a problem that the desired characteristics of the electronic device cannot be sufficiently obtained.

Therefore, an object of the present invention is to provide a method of producing an alloy strip laminate that is capable of at least one of reduction of the magnitude of the external force for dividing the alloy strip into plural pieces, improvement of the plane state of the divided alloy strip, and suppression of time-dependent change of magnetic properties, and to provide an apparatus for producing the alloy strip laminate.

The alloy strip laminate can be applied, for example, to a magnetic sheet. However, the alloy strip laminate is applicable not only to the magnetic sheet, but also to other applications as a laminate of an alloy strip in which cracks are formed.

Solution to Problem

Specific means for achieving the above object include the following aspects.

<1> A method of producing an alloy strip laminate including a step of applying an external force directly to an alloy strip of a first laminate member having an adhesive layer and the alloy strip for forming a crack in the alloy strip to prepare a first laminate including the adhesive layer and the alloy strip with the crack formed, a step of applying an external force directly to an alloy strip of a second laminate member having an adhesive layer and the alloy strip for forming a crack in the alloy strip to prepare at least one second laminate including the adhesive layer and the alloy strip with the crack formed, and a step of laminating at least one second laminate as above on the first laminate to prepare an alloy strip laminate in which the adhesive layer, and the alloy strip with the crack formed are alternately laminated.

<2> The method of producing an alloy strip laminate according to <1>, wherein the step to prepare the second laminate includes a step of adhering an alloy strip to an adhesive layer of a cracking tape including the adhesive layer and a release film that is peelable from the adhesive layer to prepare a second laminate member including the release film, the adhesive layer, and the alloy strip, a step of applying an external force directly to the alloy strip of the second laminate member to form a crack in the alloy strip, and a step of peeling off the release film to prepare a second laminate including the adhesive layer, and the alloy strip with the crack formed.

<3> The method of producing an alloy strip laminate according to <1> or <2>, wherein the step to prepare the first laminate includes a step of adhering an alloy strip to an adhesive layer of a cracking tape including the adhesive layer and a release film that is peelable from the adhesive layer to prepare a first laminate member including the release film, the adhesive layer, and the alloy strip, a step of applying an external force directly to the alloy strip of the first laminate member to form a crack in the alloy strip, and a step of peeling off the release film to prepare a first laminate including the adhesive layer, and the alloy strip with the crack formed.

<4> The method of producing an alloy strip laminate according to <2> or <3>, wherein the release film is a resin-made release film <5> The method of producing an alloy strip laminate according to any one of <1> to <4>, wherein the adhesive layer is a film substrate which both sides are coated with an adhesive.

<6> The method of producing an alloy strip laminate according to any one of <1> to <5> including a step of laminating the first laminate on a protective layer having an adhesive layer and a protective film.

<7> The method of producing an alloy strip laminate according to <1> or <2> wherein the step to prepare the first laminate includes a step of adhering an alloy strip to an adhesive layer of a protective layer including the adhesive layer and a protective film to prepare a first laminate member including the protective film, the adhesive layer, and the alloy strip, and a step of applying an external force directly to the alloy strip of the first laminate member to form a crack in the alloy strip to prepare a first laminate having the protective film, the adhesive layer, and the alloy strip with the crack formed in the mentioned order.

<8> The method of producing an alloy strip laminate according to any one of <1> to <7> including a step of adhering a protective film to one end face or both end faces in the laminating direction of the alloy strip laminate.

<9> The method of producing an alloy strip laminate according to any one of <6> to <8>, wherein the protective film is made of a resin.

<10> The method of producing an alloy strip laminate according to <1> wherein the step to prepare the second laminate includes a step of applying an external force directly to the alloy strip, in a state in which a release film which is peelable from the adhesive layer is placed on the face of the adhesive layer opposite to the face on which the alloy strip is placed, to form the crack in the alloy strip, and a step of peeling off the release film.

<11> The method of producing an alloy strip laminate according to <1> wherein the step to prepare the first laminate includes for forming the crack a step of forming the crack in the alloy strip by applying an external force directly to the alloy strip, in a state in which a protective film or a release film, which is peelable from the adhesive layer, is disposed at an opposite face of the adhesive layer from a face at which the alloy strip is placed.

<12> The method of producing an alloy strip laminate according to any one of <1> to <11>, wherein forming the crack including pressing a convex member against plural positions on a surface of the alloy strip to form plural cracks in the alloy strip.

<13> The method of producing an alloy strip laminate according to <12> including a step of forming network cracks connecting mutually the plural cracks that have been formed by pressing a convex member against the alloy strip.

<14> The method of producing an alloy strip laminate according to any one of <1> to <13>, wherein the alloy strip is a nanocrystalline alloy strip.

<15> The method of producing an alloy strip laminate according to <14>, wherein the nanocrystalline alloy strip is a nanocrystalline alloy strip prepared by performing a heat treatment for nano crystallization in a state in which a tensional force is applied to an amorphous alloy strip capable of nano crystallization.

<16> The method of producing an alloy strip laminate according to <14> or <15>, wherein the nanocrystalline alloy strip has a composition represented by the following Formula: $(Fe_{1-a}M_a)_{100-x-y-z-\alpha-\beta-\gamma}Cu_xSi_yB_zM'_\alpha M''_\beta X_\gamma$ (atom %), and in the Formula M represents at least one of Co or Ni; M' represents at least one element selected from the group consisting of Nb, Mo, Ta, Ti, Zr, Hf, V, Cr, Mn, and W; M" represents at least one element selected from the group consisting of Al, platinum group elements, Sc, rare earth elements, Zn, Sn, and Re; X represents at least one element selected from the group consisting of C, Ge, P, Ga, Sb, In, Be, and As; and a, x, y, z, α, β, and γ respectively satisfy 0≤a≤0.5, 0.1≤x≤3, 0≤y≤30, 0≤z≤25, 5≤y+Z≤30, 0≤α≤20, 0≤β≤20, and 0≤γ≤20.

<17> The method of producing an alloy strip laminate according to any one of <1> to <16>, wherein the alloy strip laminate obtained by laminating the at least one second laminate on the first laminate is a long alloy strip laminate, and the method further including winding the long alloy strip laminate into a roll shape after preparing the alloy strip laminate.

<18> The method of producing an alloy strip laminate according to <17> further including a step of unwinding the long alloy strip laminate from the roll shape and cutting the unwound long alloy strip laminate.

<19> The method of producing an alloy strip laminate according to any one of <1> to <16>, wherein the alloy strip laminate obtained by laminating the at least one second laminate on the first laminate in preparing the alloy strip laminate is a long alloy strip laminate, and the method further includes processing the long alloy strip laminate after preparing the alloy strip laminate.

<20> An apparatus for producing an alloy strip laminate, the apparatus including a plurality of mechanisms A for adhering an alloy strip to an adhesive layer of a cracking tape having the adhesive layer and a release film which is peelable from the adhesive layer, a plurality of mechanisms B for applying an external force directly to the alloy strip adhered to the cracking tape to form a crack in the alloy strip, a plurality of mechanisms C for peeling off the release film to prepare a laminate having the adhesive layer and the alloy strip with the crack formed therein, and a mechanism D for laminating a plurality of laminates formed by the plurality of mechanisms A, the plurality of mechanisms B, and the plurality of mechanisms C, and have the adhesive layer, and the alloy strip with the crack formed therein to produce an alloy strip laminate.

<21> The apparatus for producing an alloy strip laminate according to <20> further including a mechanism for processing the alloy strip laminate.

<22> The apparatus for producing an alloy strip laminate according to <20> or <21> further including a mechanism for unwinding the alloy strip wound up in a roll shape.

Advantageous Effects of Invention

According to this disclosure, a method of producing an alloy strip laminate that is able to attain at least one of reduction of the magnitude of the external force for dividing an alloy strip into plural pieces, improvement of the plane state of the divided alloy strip, and suppression of a time-dependent change of magnetic properties, as well as a production apparatus for the alloy strip laminate are provided. For example, according to this disclosure, the magnitude of the external force applied to the alloy strip for forming a crack can be reduced and the plane state of the alloy strip in which a crack is formed can be made excellent. As a result, when the alloy strip with a crack formed is laminated to form an alloy strip laminate, an alloy strip laminate superior in the plane state can be obtained. The time-dependent change of the magnetic properties of the alloy strip laminate can be suppressed. Further, an alloy strip laminate applicable to a magnetic sheet can be obtained.

BRIEF DESCRIPTION OF DRAWINGS

FIG. 7 is schematic diagrams showing the magnetic sheet obtained in the step (4).
FIG. 9 is a schematic diagram showing a cross section of the laminate obtained in the step (5).
FIG. 10 is schematic diagrams showing the laminate obtained in the step (6).
FIG. 11 is schematic diagrams showing the magnetic sheet obtained in the step (7).

DESCRIPTION OF EMBODIMENTS

Figure 1:
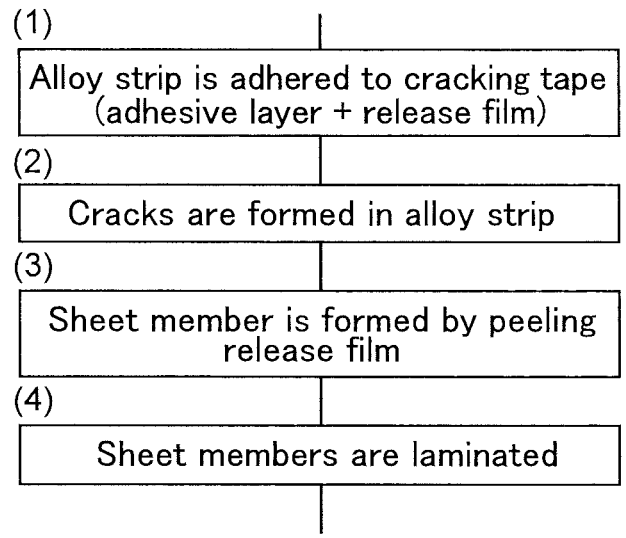
FIG. 1 is a flowchart showing the first embodiment.

The embodiments of this disclosure will be described in detail below. This disclosure is, however, not limited to the following embodiments, and may be carried out with appropriate modifications within the scope of this disclosure.

When an embodiment of this disclosure is described with reference to a drawing, the description on any duplicate component or symbol in the drawings may be omitted. The components denoted with the same symbol in the drawings means that they are the same component. The dimensional ratio in the drawings does not necessarily represent the actual dimensional ratio.

In this disclosure, a numerical range expressed by "x to y" includes the values of x and y in the range as the minimum and maximum values, respectively. In a numerical range described herein in stages, the upper or lower limit of the numerical range of one stage may be replaced with the upper limit value or the lower limit of the numerical range of the other stages. Further, in a numerical range given herein, the upper or lower limit of the numerical range may be replaced with a relevant value shown in Examples.

In this disclosure, an ordinal numeral (e.g., "first" and "second") is a term used to distinguish components, and does not limit the number of components, or the superiority or inferiority of the component.

In this disclosure, the term "step" includes not only an independent step, but also a step which need not be clearly separated from another step, insofar as an intended function of the step can be attained.

In this disclosure, a combination of two or more preferred embodiments is a more preferred embodiment.

Conventionally, for producing a magnetic sheet in which plural alloy strips made of a soft magnetic material are laminated and cracks are formed in the alloy strips, an external force was applied to form cracks in the alloy strips after a magnetic sheet was prepared by laminating plural alloy strips. In this case, a protective film or the like was attached to each side of at least one layer of the alloy strip to prepare a laminate sheet, and then flaking was performed.

This disclosure is characterized in that an external force is applied directly to each alloy strip to form cracks before laminating plural alloy strips.

According to this disclosure, an external force is directly applied to the alloy strip to form cracks, and cracks are formed in each alloy strip. By these means, an excessive external force is not required for forming cracks, and excessive deformation of the alloy strip can be suppressed. In other words, the magnitude of the external force applied to the alloy strips for forming cracks can be reduced, and the plane state of the alloy strips in which cracks are formed can be improved.

By laminating plural alloy strips obtained above so as to construct an alloy strip laminate in which an alloy strip with a crack formed and an adhesive layer are alternately laminated, an alloy strip laminate which has desired characteristics, and in which deformation is suppressed, is obtained. The alloy strip laminate according to this disclosure may be applied as a magnetic sheet. The alloy strip laminate according to this disclosure may be also formed to a blockish laminate or a toroidal-shaped laminate. For example, the alloy strip laminate according to this disclosure may be used as an induction device or the like.

An embodiment of this disclosure is a method of producing an alloy strip laminate including (1) a step of applying an external force directly to an alloy strip of a first laminate member having an adhesive layer and the alloy strip for forming a crack in the alloy strip to prepare a first laminate including the adhesive layer and the alloy strip with the crack formed, (2) a step of applying an external force directly to an alloy strip of a second laminate member having an adhesive layer and the alloy strip for forming a crack in the alloy strip to prepare at least one second laminate including the adhesive layer and the alloy strip with the crack formed, and (3) a step of laminating at least one second laminate as above on the first laminate to prepare an alloy strip laminate in which the adhesive layer, and the alloy strip with the crack formed are alternately laminated.

Since in the method of producing an alloy strip laminate according to an embodiment of this disclosure, an external force is directly applied to a single alloy strip to form a crack, the applied external force works directly on the alloy strip, and needs the strength only enough to cause a crack in the single alloy strip. As a result, compared to the conventional production method in which plural alloy strips are laminated and then an external force is applied at the same time to them for forming cracks, or the conventional production method in which an external force is applied through a protective film for forming cracks, the applied external force can be reduced, and the surface state of the divided alloy strips may be in a superior plane state where ruggedness is suppressed. In this regard, "superior plane state" means that there is no ruggedness on the surface of the object, or there is little ruggedness on the surface of the object. When the term "superior plane state" is used for divided alloy strips, "superior plane state" means in addition to the above meaning that, when the respective divided alloy strips are evaluated as a whole, the strips are in a flat state In this disclosure, the term "laminate member" is used to distinguish it from a laminate having an alloy strip in which a crack has been formed, and refers to a laminate having an alloy strip in which a crack is not yet formed. As described later, a laminate member can be formed by adhering an alloy strip to an adhesive layer in a cracking tape including the adhesive layer and a release film that is peelable from the adhesive layer. Alternatively, a laminate member can be formed by adhering an alloy strip to an adhesive layer in a protective layer including the adhesive layer and a protective film.

In this disclosure, the term "second laminate" is used to distinguish it from the first laminate, and refers to one or more laminates to be laminated on the first laminate.

In the method of producing an alloy strip laminate according to an embodiment of this disclosure, a region where the adhesive layer and the alloy strip with a crack formed are alternately laminated is formed by laminating at least one second laminate on the first laminate. For example, a region where the adhesive layer and the alloy strip with a crack formed are alternately laminated can be formed by bringing the alloy strip of a laminate (for example, the first laminate) and the adhesive layer of another laminate (for example, the second laminate) into contact. There is no particular restriction on the layer structure of the alloy strip laminate, insofar as it includes a region where the adhesive layer and the alloy strip with a crack formed are alternately laminated. The smallest unit of the region where the adhesive layer and the alloy strip with a crack formed are alternately laminated is "adhesive layer/alloy strip with a crack formed/adhesive layer/alloy strip with a crack formed" formed by laminating two laminates (that is, the first laminate, and the second laminate). The number of the second laminates laminated on the first laminate may be two or more. When there are two or more second laminates, the second laminates may be one by one laminated on the first laminate. The outermost layer(s) located in one or both ends in the lamination direction of the alloy strip laminate may be layer(s) other than an adhesive layer and a metal strip in which a crack is formed (for example, protective film). As long as an alloy strip laminate where the adhesive layer and the alloy strip with a crack formed are alternately laminated can be obtained, the first laminate may be laminated on the second laminate.

In an embodiment, when a crack is formed, the alloy strip is in a state of being adhered to a release film or a protective film through the intermediary of the adhesive layer. Therefore, generation of ruggedness on the surface of the alloy strip is further suppressed by virtue of the elasticity of the release film or the protective film. Further, even when the ruggedness appears on the surface of the alloy strip, the ruggedness is deformed to be flattened by the elasticity of the release film or the protective film. Some embodiments in which the release film or the protective film is used when a crack is formed in the alloy strip will be described below.

For example, in the step of preparing the first laminate, it is preferable in connection with formation of a crack that there is a step of forming the crack in the alloy strip by applying an external force directly to the alloy strip in a state in which a "protective film" or a "release film", which is peelable from the adhesive layer, is disposed at an opposite face of the adhesive layer from a face at which an alloy strip is disposed. By applying an external force directly to the alloy strip adhered to a protective film or a release film through the intermediary of an adhesive layer, an alloy strip with excellent surface condition can be obtained. In the above method, the protective film or release film should be present at least when an external force is directly applied to the alloy strip. For example, after preparing the first laminate member having an adhesive layer and an alloy strip, and a protective film or a release film, respectively, and when the adhesive layer of the first laminate member and the protective film or release film are brought into contact, an external force may be directly applied to the alloy strip. For example, it is also possible that a first laminate member having a protective film or release film, an adhesive layer, and an alloy strip is prepared in advance, and then an external force is applied directly to the alloy strip. After forming a crack, the release film may be peeled off as necessary.

For example, the step of preparing the first laminate preferably includes (1) a step of adhering an alloy strip to an adhesive layer of a cracking tape including the adhesive layer and a release film that is peelable from the adhesive layer to prepare a first laminate member including the release film, the adhesive layer, and the alloy strip, (2) a step of applying an external force directly to the alloy strip of the first laminate member to form a crack in the alloy strip, and (3) a step of peeling off the release film to prepare a first laminate including the adhesive layer, and the alloy strip with the crack formed. By applying an external force directly to the alloy strip adhered to the release film through the adhesive layer, it is possible to obtain an alloy strip with a superior surface condition.

For example, the step of preparing the first laminate preferably includes (1) a step of adhering an alloy strip to an adhesive layer of a protective layer including the adhesive layer and a protective film to prepare a first laminate member including the protective film, the adhesive layer, and the alloy strip, and (2) a step of applying an external force directly to the alloy strip of the first laminate member to form a crack in the alloy strip to prepare a first laminate having the protective film, the adhesive layer, and the alloy strip with the crack formed in the mentioned order. By applying an external force directly to the alloy strip adhered to the protective film through the adhesive layer, it is possible to obtain an alloy strip with a superior surface condition.

For example, the step of preparing the second laminate preferably includes (1) a step of applying an external force directly to the alloy strip, in a state in which a release film, which is peelable from the adhesive layer, is disposed at an opposite face of the adhesive layer from a face at which the alloy strip is disposed, to form the crack in the alloy strip, and (2) a step of peeling off the release film. By applying an external force directly to the alloy strip adhered to the release film through the adhesive layer, it is possible to obtain an alloy strip with a superior surface condition. In the above method, the release film should be present at least when an external force is directly applied to the alloy strip. For example, after preparing the second laminate member having an adhesive layer and an alloy strip, and a release film respectively, and when the adhesive layer of the second laminate member and the release film are brought into contact, an external force may be directly applied to the alloy strip. For example, it is also possible that a second laminate member having a release film, an adhesive layer, and an alloy strip is prepared in advance, and then an external force is applied directly to the alloy strip.

For example, the step of preparing the second laminate preferably includes (1) a step of adhering an alloy strip to an adhesive layer of a cracking tape including the adhesive layer and a release film that is peelable from the adhesive layer to prepare a second laminate member including the release film, the adhesive layer, and the alloy strip, (2) a step of applying an external force directly to the alloy strip of the second laminate member to form a crack in the alloy strip, and (3) a step of peeling off the release film to prepare a second laminate including the adhesive layer, and the alloy strip with the crack formed. By applying an external force directly to the alloy strip adhered to the release film through the adhesive layer, it is possible to obtain an alloy strip with a superior surface condition.

As described above, since the alloy strip laminate of this disclosure is produced by laminating an alloy strip in an excellent plane state, the surface of the alloy strip laminate is also in an excellent plane state.

As a result, the factors that fluctuate the magnetic properties can be reduced, so that an alloy strip laminate with a small time-dependent change in the magnetic properties can be obtained.

The alloy strip laminate according to this disclosure may be a long alloy strip laminate. The alloy strip laminate obtained by laminating at least one second laminate on the first laminate in the step of preparing an alloy strip laminate is preferably a long alloy strip laminate. The long alloy strip laminate can be produced, for example, using a long alloy strip. When a long alloy strip laminate is produced in the step of preparing an alloy strip laminate, the method of producing an alloy strip laminate of an embodiment of this disclosure preferably includes a step of winding up the long alloy strip laminate into a roll shape after the step of preparing an alloy strip laminate. Further, the method of producing an alloy strip laminate of an embodiment of this disclosure preferably includes a step of unwinding a long alloy strip laminate wound up in a roll shape and cutting out the same. Further, when a long alloy strip laminate is prepared in the step of preparing the alloy strip laminate, the method of producing an alloy strip laminate of an embodiment of this disclosure preferably includes a step of processing (preferably cutting out) a long alloy strip laminate after the step of preparing an alloy strip laminate. In the above step, an alloy strip laminate processed into a desired shape can be obtained.

The present disclosure will be described in more detail below, but this disclosure is not limited to this Embodiment.

In the following, in explaining the alloy strip laminate of this disclosure, a magnetic sheet, which is an aspect of the alloy strip laminate, will be described as an example. This magnetic sheet corresponds to an alloy strip laminate of this disclosure.

[Magnetic Sheet]

An example of the magnetic sheet of this disclosure is one in which plural alloy strips made of a soft magnetic material are laminated, and a crack is formed in the alloy strip. The crack means herein a magnetic gap formed in an alloy strip, and includes, for example, splits and/or fissures in the alloy strip.

The magnetic sheet preferably includes an alloy strip which splits and/or fissures (hereinafter referred to as network crack) connect the cracks with each other.

When a network crack is formed in an alloy strip, for example, the effects as described in JP-A No. 2018-112830 can be obtained. That is, when the magnetic sheet is used as a magnetic material for an inductor, the Q value can be further improved. Further, when the magnetic sheet is used as a magnetic material for a magnetic shield, the current path in the alloy strip can be divided and the eddy current loss can be further reduced.

In the magnetic sheet of this disclosure, plural alloy strips are laminated. The alloy strips are mutually laminated, for example, through an intermediary of an adhesive layer. The adhesive layer may be formed using a heretofore known adhesive, such as an acrylic adhesive, a silicone adhesive, a urethane adhesive, a synthetic rubber, and a natural rubber. An acrylic adhesives are preferable since they are excellent in heat resistance and moisture resistance and have a wide range of adhesive materials. The adhesive layer of this disclosure may have a monolayer structure or a multi-layer structure. For example, the adhesive layer may be an adhesive layer having a monolayer structure containing an adhesive. The adhesive layer may be a film substrate, both the sides of which are coated with an adhesive (layer structure: adhesive/film substrate/adhesive.)

When three or more layers of the alloy strip are laminated, the adhesive layers between the respective layers may be the same or different.

[Protective Film]

In a magnetic sheet, a protective film may be further laminated. The protective film functions to prevent cracks or network crack from unnecessarily increasing due to an unintended external force, or the alloy strip from falling off, or rusting. It also functions to prevent unnecessary deformation such as ruggedness on the surface when the magnetic sheet is processed into a predetermined shape.

The protective film may be laminated alone, or may be laminated as a protective layer having an adhesive layer and a protective film. When laminated alone, the alloy strip and the protective film may be sometimes bonded together by the adhesive layer of a sheet member described later (an example of the laminate of this disclosure. The same shall apply hereinafter). When laminated as a protective layer, the alloy strip and the protective film may be sometimes bonded together by the adhesive layer of the protective layer.

The protective film is preferably laminated so as to cover an exposed alloy strip.

When a protective layer is formed on a magnetic sheet, a method by which a sheet member is laminated on the protective layer, or a method by which an alloy strip is adhered to the protective layer, an external force is applied directly to the alloy strip to form a crack in the alloy strip, and a sheet member is laminated on the alloy strip with a crack formed, may be used. As a specific example of the former method, there is a step of laminating a first laminate on the protective layer having the adhesive layer and the protective film. In the above step, it is preferable that the adhesive layer of the protective layer and the adhesive layer of the first laminate are brought into contact.

The protective film is preferably a protective film made of a resin, and more preferably a protective film made of an elastic resin. As described above, for example, the step of preparing the first laminate may include (1) a step of adhering an alloy strip to an adhesive layer of a protective layer including the adhesive layer and a protective film to prepare a first laminate member including the protective film, the adhesive layer, and the alloy strip, and (2) a step of applying an external force directly to the alloy strip of the first laminate member to form a crack in the alloy strip to prepare a first laminate having the protective film, the adhesive layer, and the alloy strip with the crack formed in the mentioned order. When the protective film is made of a resin, generation of ruggedness on the surface of the alloy strip is further suppressed owing to the elasticity of the protective film. Further, even if ruggedness is generated on the surface of the alloy strip, the ruggedness is deformed to a flat state by the elasticity of the protective film. By this means it is possible to make an alloy strip to be in an excellent plane state, so that a magnetic sheet having a small time-dependent change in magnetic properties can be obtained. For example, as the resin for the protective film, a resin having the lower limit of the tensile modulus of elasticity of 0.1 GPa can be used. When the tensile modulus of elasticity is 0.1 GPa or more, the above effect will be sufficiently obtained. The lower limit of the tensile modulus of elasticity is preferably 0.5 GPa, more preferably 1.0 GPa. The upper limit of the tensile modulus of elasticity is preferably 10 GPa. When the tensile modulus of elasticity exceeds 10 GPa, the deformation of the alloy strip may be suppressed when a crack is formed. The upper limit of the tensile modulus of elasticity is preferably 7 GPa, and more preferably 5 GPa.

The protective film is preferably a protective film having a thickness of from 1 μm to 100 μm. As the thickness of the protective film increases, it becomes difficult to deform it, which may hinder the placement of a magnetic sheet conforming to a curved surface or a bent surface. Meanwhile, when the thickness is less than 1 μm, the protective film itself is more easily deformed. In this case handling becomes difficult, and the function to support the alloy strip may be not adequately obtained. In addition, the film strength may be compromised, and the protective function may be not adequate.

A magnetic sheet to be used for a portable device such as a smartphone and a cell phone is required to be thin. Therefore, with respect to the magnetic sheet for a portable device, the upper limit of the thickness of the protective film is preferably 100 μm or less, and more preferably 20 μm.

In the protective layer, the protective film may be a release film that can be peeled off from the adhesive layer. In this case, the protective layer functions as a protective layer until the protective film is peeled off.

After the protective film is peeled off, the magnetic sheet is adhered to an object to be shielded such as an electronic device by the adhesive layer.

In this case, a protective film having a thickness of more than 20 μm may be also used for the purpose of improving the processability of a magnetic sheet.

A protective film may be laminated on one end face or both end faces in the laminating direction of the magnetic sheet. At least one of the protective films placed on both the end faces in the laminating direction of the magnetic sheet may be made peelable from the adhesive layer. For example, by the step of adhering a protective film onto one end face or both end faces in the laminating direction of the magnetic sheet, a protective film can be laminated on one end face or both end faces in the laminating direction of the magnetic sheet, Further, after an alloy strip laminate is prepared by laminating plural sheet members, a protective film can be adhered to one end face or both end faces in the laminating direction of the alloy strip laminate, As the resin for the protective film, for example, polyethylene terephthalate (PET), polyimide, polyetherimide, polyethylene naphthalate, polypropylene, polyethylene, polystyrene, polycarbonate, polysulfone, polyetherketone, polyvinyl chloride, polyvinyl alcohol, a fluorocarbon polymers, an acrylic resin, and cellulose can be used. Polyamide and polyimide are particularly preferable from the viewpoint of heat resistance and dielectric loss.

As the adhesive layer for the protective layer, a known one such as a pressure-sensitive adhesive may be used. As the pressure-sensitive adhesive, for example, an acrylic-, a silicone-, a urethane-, a synthetic rubber-, and a natural rubber-pressure-sensitive adhesive may be used. The adhesive layer may be a film substrate which both sides are coated with an adhesive (layer structure: adhesive/film substrate/adhesive).

[Alloy Strip]

As the alloy strip, for example, an alloy strip produced by roll quenching and having a thickness of 100 μm or less can be used. The thickness of the alloy strip is preferably 50 μm or less, more preferably 30 μm or less, and particularly preferably 25 μm or less. Meanwhile, when the thickness of the alloy strip is too thin, its handling becomes difficult. Therefore, the thickness of the alloy strip is preferably 5 μm or more, and more preferably 10 μm or more.

For example, the alloy strip has an Fe-based or Co-based alloy composition, and the alloy strip of a nanocrystalline alloy or an amorphous alloy may be used.

As the alloy strip, in particular, the alloy strip composed of a nanocrystalline alloy (hereinafter occasionally referred to as "nanocrystalline alloy strip") is preferably used. Since a nanocrystalline alloy strip is mechanically more brittle than an amorphous alloy strip, when a crack is formed by applying an external force directly to the alloy strip, a crack can be formed with a small external force. As the consequence, a crack can be formed without substantially forming ruggedness on the surface of the alloy strip, so that the alloy strip can exhibit an excellent plane state. Therefore, the time-dependent change in the shape of the alloy strip after assembled to a magnetic sheet is so small and the time-dependent change in the magnetic properties can be suppressed.

As described above in an embodiment, crack formation is carried out by applying an external force directly to the alloy strip in a state in which a protective film or a release film, which is peelable from an adhesive layer, is disposed at an opposite side of the adhesive layer from a side at which the alloy strip is disposed. By this method, a crack is formed easily in a nanocrystalline alloy strip, so that deformation of the release film or protective film due to an external force can be suppressed. Consequently, an alloy strip in an excellent plane state can be prepared, and a magnetic sheet with a small time-dependent change in magnetic properties can be obtained.

An alloy strip composed of a nanocrystalline alloy is produced, for example, by a production method including a step of preparing an amorphous alloy strip capable of nano crystallization by quenching a molten alloy metal, and a heat treatment step of heat-treating the amorphous alloy strip at a temperature equal to or higher than the crystallization starting temperature to form fine crystal grains. Although the temperature of the heat treatment varies depending on the alloy composition, it is generally 450° C. or higher.

Examples of a fine crystal grain include Fe with a body-centered cubic lattice structure in which Si or the like is dissolved. The analysis of the fine crystal grain can be performed using X-ray diffraction and a transmission electron microscope. In a nanocrystalline alloy at least 50% by volume of the nanocrystalline alloy is occupied by fine crystal grains with an average grain diameter of 100 nm or less measured in terms of the maximum dimension. The portion of the nanocrystalline alloy other than the fine crystal grains is mainly amorphous. In addition, the proportion of fine crystal grains may be substantially 100% by volume.

As the nanocrystalline alloy strip, a nanocrystalline alloy strip obtained by performing a heat treatment for nano crystallization in a state where a tensile force is applied to an amorphous alloy strip capable of nano crystallization, may be used.

Examples of the alloy composition of an amorphous alloy strip capable of nano crystallization include the composition represented by the following Formula. For example, by heat-treating an amorphous alloy strip having a composition represented by the following Formula, a nanocrystalline alloy strip having a composition represented by the following Formula can be obtained. The nanocrystalline alloy strip preferably has a composition represented by the following Formula.

Formula: $(Fe_{1-a}M_a)_{100-x-y-z-\alpha-\beta-\gamma}Cu_xSi_yB_zM'_\alpha M''_\beta X_\gamma$ (atom %)

In the above Formula, M is Co and/or Ni; M' is at least one element selected from the group consisting of Nb, Mo, Ta, Ti, Zr, Hf, V, Cr, Mn, and W; M" is at least one element selected from the group consisting of Al, platinum group elements, Sc, rare earth elements, Zn, Sn, and Re; and X is at least one element selected from the group consisting of C, Ge, P, Ga, Sb, In, Be, and As. Further, a, x, y, z, α, β, and γ respectively satisfy $0 \leq a \leq 0.5$, $0.1 \leq x \leq 3$, $0 \leq y \leq 30$, $0 < < 25$, $5 \leq y+z \leq 30$, $0 < \alpha < 20$, $0 < \beta < 20$, and $0 < \gamma < 20$.

Preferably, in the above Formula, a, x, y, z, α, β and γ are respectively $0 \leq a \leq 0.1$, $0.7 < x < 1.3$, $12 < < 17$, $5 < z < 10$, $1.5 < \alpha < 5$, $0 < \beta < 1$, and $0 < \gamma < 1$.

Next, an embodiment of the heat treatment in the case in which a nanocrystalline alloy strip obtained by performing a heat treatment for nano crystallization in a state where a tensile force is applied to an amorphous alloy strip capable of nano crystallization is used as the alloy strip will be described.

First, the step of preparing an amorphous alloy strip capable of nano crystallization of this embodiment will be described.

An amorphous alloy strip capable of nano crystallization is, for example, an alloy strip in an amorphous state, from which nanocrystals can be formed by conducting a heat treatment, and can be produced by quenching and solidifying a molten metal having an alloy composition for a nanocrystalline alloy. As a method of quenching and solidifying a molten metal, a method called single roll method or twin roll method can be used. These are methods using roll cooling. As such a method using roll cooling, a well-known method can be applied. By the method using roll cooling, a long amorphous alloy strip can be produced by continuously quenching the molten metal. The quenched and solidified product in a strip form does not include nanocrystals and is in an amorphous state, which is afterwards transformed to nanocrystals (nano crystallization) by conducting a heat treatment to form a nanocrystalline alloy strip. Commonly the long amorphous alloy strip is wound around a spool and transported as a roll-shaped wound body. In some cases, an amorphous alloy strip capable of nano crystallization includes fine crystals. In that case, the fine crystals become nanocrystals by a heat treatment.

Next, a step of obtaining a nanocrystalline alloy strip by performing a heat treatment for nano crystallization in a state where a tensile force is applied to an amorphous alloy strip of this embodiment will be described.

By performing a heat treatment for nano crystallization in a state where a tensile force is applied to an amorphous alloy strip capable of nano crystallization, the alternating current relative magnetic permeability μr of the nanocrystalline alloy strip can be adjusted. It is preferable to obtain a nanocrystalline alloy strip having an alternating current relative magnetic permeability μr of from 100 to 2000 by this step. In this regard, a nanocrystalline alloy is an alloy having a microcrystalline structure with a grain diameter of 100 nm or less.

In the present embodiment, for example, an amorphous alloy strip is made to continuously travel in a state where a tensile force is applied so as to cause nano crystallization of a partial region of the amorphous alloy strip. The nano crystallization is performed by applying a heat equal to or higher than the crystallization starting temperature, and for example means in which a strip is sent through a heating furnace, or a strip is brought into contact with a heating medium, may be employed. In this embodiment specifically, for example, the amorphous alloy strip in the state where tensile force is applied and the heating medium are brought into contact with each other, and the amorphous alloy strip is made to travel continuously while keeping the contact with the heating medium. The amorphous alloy strip is heat-treated by contacting with the heating medium to become nanocrystalline alloy strip.

At this time, the direction of the tensile force being applied to the amorphous alloy strip is the same as the travel direction of the amorphous alloy strip just before coming into contact with the heating medium, the travel direction of the amorphous alloy strip in the midst of contact with the heating medium, and the travel direction of the nanocrystalline alloy strip immediately after leaving the heating medium. In any cases, it is linear. In a case where the amorphous alloy strip is made to travel for a treatment, the amorphous alloy strip is a long amorphous alloy strip, and the longitudinal direction of the amorphous alloy strip and the direction of the applied tensile force are the same.

However, the amorphous alloy strip may meander while passing through transfer rollers or the like on the upstream side in the traveling direction from the point "just before coming into contact with the heating medium". Similarly, a nanocrystalline alloy strip obtained from the amorphous alloy strip may meander while passing through transfer rollers or the like on the downstream side in the traveling direction from the point "immediately after leaving the heating medium".

The tensile force is preferably from 1.0 N to 50.0 N, more preferably from 2.0 N to 40.0 N, and particularly preferably 3.0 N to 35.0 N.

When the tensile force is 1.0 N or more, the magnetic permeability can be sufficiently reduced.

When the tensile force is 50.0 N or less, the breakage of the amorphous alloy strip or nanocrystalline alloy strip can be better suppressed.

In the heat treatment for nano crystallization of this embodiment, the temperature of the amorphous alloy strip is raised to the end-point temperature beyond the crystallization temperature Tc1 (for example, 430° C. or more). As a result, nano crystallization proceeds in the structure of the alloy strip.

The end-point temperature is preferably from 430° C. to 600° C.

When the end-point temperature is 600° C. or lower (particularly, when the B content is from 10 atom % to 20 atom % or less), for example, the precipitation frequency of an Fe-B compound, which may deteriorate the soft magnetic properties (Hc, Bs, etc.) of a nanocrystalline alloy strip, can be better reduced.

It is preferable that the end-point temperature to be set and the temperature of the heating medium are identical.

When a heating medium is used for the heat treatment for nano crystallization, examples of the heating medium include a plate, and twin rolls. A plate-shaped one is preferable, because the contact area with the amorphous alloy strip is large. The contact surface of a plate-shaped one is preferably planar, however it may include some curved portion. Further, a suction hole may be provided in the contact surface of the heating medium with an alloy strip such that vacuum attraction can work at the suction hole. By this means, the alloy strip can be attracted to the surface provided with the suction hole of the heating medium, so that tighter contact of the alloy strip with the heating medium is established and the efficiency of heat treatment can be improved.

Examples of the material for the heating medium include copper, a copper alloy (bronze, brass, etc.), aluminum, iron, and an iron alloy (stainless steel, etc.). Of these, copper, a copper alloy, or aluminum is preferable because it has a high thermoelectric conductivity (heat transfer rate).

The heating medium may have undergone a plating treatment such as Ni plating, Ag plating.

Means for heating this heating medium may be separately provided, and the heated heating medium and the amorphous alloy strip are brought into contact to heat the amorphous alloy strip for a heat treatment. Further, the heating medium may be enclosed with an optional member.

Further, in this embodiment, the temperature of the nanocrystalline alloy strip may be kept constant for a certain period on the heating medium after the temperature is raised to the end-point temperature.

Further, in this embodiment, the obtained nanocrystalline alloy strip is preferably cooled down (preferably to room temperature).

Further, in the present embodiment, there may be a step of winding up the obtained nanocrystalline alloy strip (preferably the nanocrystalline alloy strip after cooling) to form a wound body of the nanocrystalline alloy strip.

The thickness of the amorphous alloy strip capable of nano crystallization in this embodiment is preferably in a range of from 10 μm to 50 μm. When it is less than 10 μm, the mechanical strength of the alloy strip itself is low, so that it is difficult to stably cast a long alloy strip. Meanwhile, when it exceeds 50 μm, part of the alloy is prone to crystallize, and the characteristics may be deteriorated. The thickness of the amorphous alloy strip is more preferably from 11 μm to 30 μm, and further preferably from 12 μm to 27 μm.

The width of the amorphous alloy strip is not particularly limited, however it is preferably from 5 mm to 300 mm. When the width of the amorphous alloy strip is 5 mm or more, the manufacturing suitability of the amorphous alloy strip is excellent. When the width of the amorphous alloy strip is 300 mm or less, the uniformity of nano crystallization in the step of producing a nanocrystalline alloy strip is improved. The width of the amorphous alloy strip is preferably 200 mm or less.

In this embodiment, a nanocrystalline alloy strip may be produced by installing a continuous line, in which an amorphous alloy strip is unwound from the amorphous alloy strip formed into a roll-shaped wound body, the amorphous alloy strip is made to travel under application of a tensile force to the amorphous alloy strip, the traveling amorphous alloy strip is brought into contact with a heating medium for heating, to cause nano crystallization by the heat treatment to produce a nanocrystalline alloy strip, and the nanocrystalline alloy strip is wound up into a roll-shaped wound body.

Figure 21:
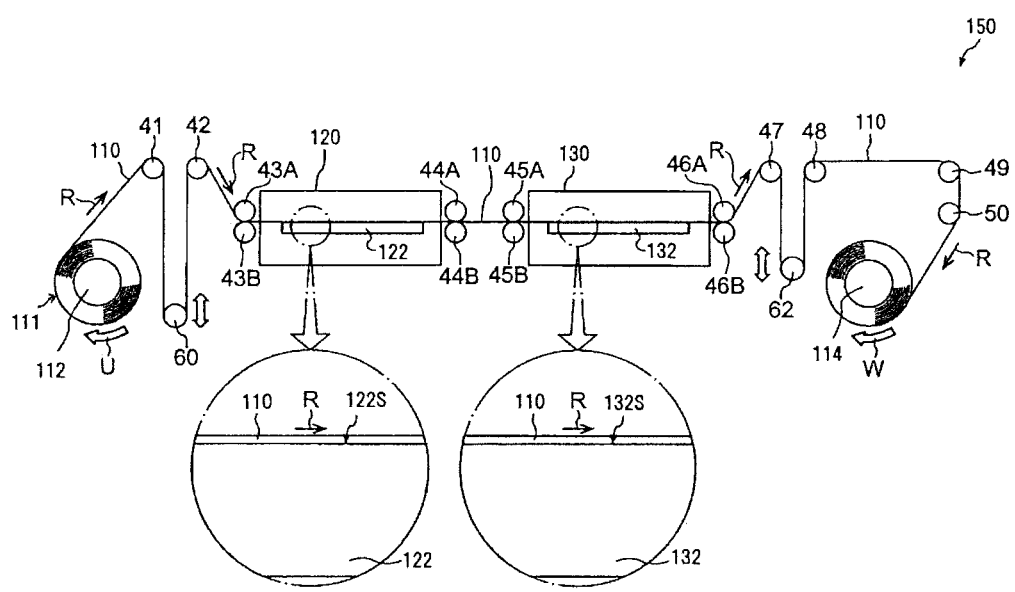
FIG. 21 is a schematic diagram of an in-line annealing device for obtaining a nanocrystalline alloy strip.

An embodiment of a production method of a nanocrystalline alloy strip by installing a continuous line will be described with reference to FIG. 21. FIG. 21 illustrates an in-line annealing device 150, which performs an in-line annealing step of producing a nanocrystalline alloy strip by applying a continuous heat treatment step including a temperature raising step and a temperature lowering (cooling) step to a long amorphous alloy strip from an unwinding roll through a winding roll.

The in-line annealing device 150 is provided with an unwinding roller 112 (unwinding device) for unwinding an alloy strip 110 from a wound body 111 of an amorphous alloy strip; a heating plate (heating medium) 122 for heating the alloy strip 110 unwound from the unwinding roller 112, and a cooling plate (heating medium) 132 for lowering the temperature of the alloy strip 110 heated by the heating plate 122; and a winding roller 114 (winding device) for winding up the alloy strip 110 cooled down by the cooling plate 132. In FIG. 21, the traveling direction of the alloy strip 110 is indicated by the arrow R.

The wound body 111 of an amorphous alloy strip is set on the unwinding roller 112.

When the unwinding roller 112 rotates axially in the direction of the arrow U, the alloy strip 110 is unwound from the wound body 111 of an amorphous alloy strip.

In this example, the unwinding roller 112 itself may have a rotating mechanism (for example, a motor), and the unwinding roller 112 itself need not have a rotating mechanism.

Even when the unwinding roller 112 itself does not have a rotation mechanism, an alloy strip 110 is unwound from the wound body 111 of the amorphous alloy strip set on the unwinding roller 112 linked with the winding movement of the alloy strip 110 by the winding roller 114 described later.

In FIG. 21, as shown in the circled enlarged portion, the heating plate 122 includes a first plane surface 122S with which the alloy strip 110 unwound from the unwinding roller 112 travels in contact. The heating plate 122 heats via the first plane surface 122S the alloy strip 110 traveling along the first plane surface 122S in contact with the first plane surface 122S. In this way the traveling alloy strip 110 is rapidly heated for nano crystallization stably.

The heating plate 122 is connected to a heat source which is not illustrated, and is heated to a desired temperature by the heat supplied from this heat source. The heating plate 122 may have a heat source inside the heating plate 122 itself, instead of being connected to the heat source, or in addition to being connected to the heat source.

Examples of the material for the heating plate 122 include stainless steel, Cu, a Cu alloy, and an Al alloy.

The heating plate 122 is housed in a heating chamber 120.

The heating chamber 120 may be provided with a heat source for controlling the temperature of the heating chamber, in addition to the heat source for the heating plate 122.

The heating chamber 120 has openings (not illustrated) respectively on the upstream side and the downstream side in the traveling direction (arrow R) of the alloy strip 110 for entry and exit of the alloy strip. The alloy strip 110 enters the heating chamber 120 through the entry that is the upstream opening and leaves the heating chamber 120 through the exit that is the downstream opening.

Further, as shown in the circled enlarged portion in FIG. 21, the cooling plate 132 includes a second plane surface 132S with which the alloy strip 110 travels in contact. The cooling plate 132 cools via the second plane surface 132S the alloy strip 110 traveling along the second plane surface 132S in contact with the second plane surface 132S.

The cooling plate 132 may have a cooling mechanism (for example, water cooling mechanism), or need not have a special cooling mechanism.

Examples of the material for the cooling plate 132 include stainless steel, Cu, a Cu alloy, and an Al alloy.

The cooling plate 132 is housed in the cooling chamber 130.

The cooling chamber 130 may have a cooling mechanism (for example, water cooling mechanism), or need not have a special cooling mechanism. That is, the mode of cooling by the cooling chamber 130 may be water cooling, or air cooling.

The cooling chamber 130 has openings (not illustrated) respectively on the upstream side and the downstream side in the traveling direction (arrow R) of the alloy strip 110 for entry and exit of the alloy strip. The alloy strip 110 enters the cooling chamber 130 through the entry that is the upstream opening and leaves the cooling chamber 130 through the exit that is the downstream opening.

The winding roller 114 is provided with a rotation mechanism (for example, motor) that rotates axially in the direction of the arrow W. By the rotation of the winding roller 114, the alloy strip 110 is wound up at a desired speed.

The in-line annealing device 150 includes a guide roller 41, a dancer roller 60 (one of tensile stress adjusting devices), a guide roller 42, and a pair of guide rollers 43A and 43B between the unwinding roller 112 and the heating chamber 120 along the traveling route of the alloy strip 110. The adjustment of the tensile stress is also performed by moving control of the unwinding roller 112 and the winding roller 114.

The dancer roller 60 is provided so as to be movable in the vertical direction (directions of the two-directional arrow in FIG. 21). By adjusting the vertical position of the dancer roller 60, the tensile stress of the alloy strip 110 can be adjusted.

In this way, it is possible to perform a heat treatment for nano crystallization in a state where a tensile force is applied to the amorphous alloy strip.

The alloy strip 110 unwound from the unwinding roller 112 is guided into the heating chamber 120 via these guide rollers and dancer roller.

The in-line annealing device 150 includes a pair of guide rollers 44A and 44B, and a pair of guide rollers 45A and 45B between the heating chamber 120 and the cooling chamber 130.

The alloy strip 110 that has left the heating chamber 120 is guided into the cooling chamber 130 via these guide rollers.

The in-line annealing device 150 includes a pair of guide rollers 46A and 46B, a guide roller 47, and a dancer roller 62, a guide roller 48, a guide roller 49, and a guide roller 50 between the cooling chamber 130 and the winding roller 114 along the traveling route of the alloy strip 110.

The dancer roller 62 is provided so as to be movable in the vertical direction (directions of the two-directional arrow in FIG. 21). By adjusting the vertical position of the dancer roller 62, the tensile stress of the alloy strip 110 can be adjusted.

The alloy strip 110 that has left the cooling chamber 130 is guided to the winding roller 114 via these guide rollers and dancer roller.

In the in-line annealing device 150, the guide rollers (43A, 43B, 44A, and 44B) placed on the upstream side and the downstream side of the heating chamber 120 have a function of adjusting the position of the alloy strip 110 so that the alloy strip 110 and the first plane surface 122S of the heating plate 122 entirely come into contact.

In the in-line annealing device 150, the guide rollers (45A, 45B, 46A, and 46B) placed on the upstream side and the downstream side of the cooling chamber 130 have a function of adjusting the position of the alloy strip 110 so that the alloy strip 110 and the second plane surface 132S of the cooling plate 132 entirely come into contact.

By this in-line annealing device 150 a nanocrystalline alloy strip is produced, and using this nanocrystalline alloy strip the aforedescribed alloy strip laminate may be produced.

[Cracking Tape]

In an embodiment, when a crack is formed in the alloy strip, a cracking tape is adhered to the alloy strip.

The cracking tape includes an adhesive layer and a release film peelable from the adhesive layer. The cracking tape is adhered to one side of the alloy strip, and supports the alloy strip when the alloy strip is cracked. Thereafter, the release film is peeled off to expose the adhesive layer, so that a sheet member (an example of the laminate in this disclosure) having the adhesive layer and the alloy strip with a crack formed, is prepared. The sheet member can be adhered to another alloy strip or the like by the adhesive layer. The adhesive layer of the cracking tape remains on the magnetic sheet. Since the release film is occasionally peeled off from the adhesive layer in the course of production, it remains not always on the magnetic sheet.

[Release Film]

The release film is preferably a release film made of a resin, and more preferably a release film made of an elastic resin.

The method of producing an alloy strip laminate of an embodiment of this disclosure includes a step of adhering an alloy strip to a cracking tape having an adhesive layer and a release film peelable from the adhesive layer, and a step of applying an external force directly to the alloy strip to form a crack. In this case, when the release film is made of a resin, formation itself of ruggedness on the surface of the alloy strip is suppressed by the elasticity of the release film. Further, even when ruggedness is formed on the surface of the alloy strip, the ruggedness is deformed to be flattened due to the elasticity of the release film. As a result, an alloy strip superior in plane state can be obtained so that a magnetic sheet having a small time-dependent change in magnetic properties can be obtained.

For example, as the resin for a release film, a resin having a lower limit of tensile modulus of elasticity of 0.1 GPa can be used. When the tensile modulus of elasticity is 0.1 GPa or more, the above effect is apt to be obtained sufficiently. The lower limit of the tensile modulus of elasticity is preferably 0.5 GPa, and more preferably 1.0 GPa. The upper limit of the tensile modulus of elasticity is preferably 10 GPa. When it exceeds 10 GPa, the deformation of the alloy strip may sometimes be suppressed when a crack is formed. The upper limit of the tensile modulus of elasticity is preferably 7 GPa, and more preferably 5 GPa. As the resin for a release film, the same resin as that of the protective film of the protective layer can be used.

Further, the release film is preferably a release film having a thickness of from 1 μm to 100 μm. As the thickness of the release film increases, it becomes difficult to deform, which may hinder the placement of a magnetic sheet conforming to a curved surface or a bent surface. Further, when the thickness is less than 1 μm, the release film itself is more easily deformed, which makes it difficult to handle it, and the function of supporting the alloy strip may be not necessarily obtained sufficiently.

As the adhesive layer, the same adhesive layer as for the protective layer may be used.

[Crack]

A crack can be formed, for example, by pressing a convex member against the surface of the alloy strip. The shape of the convex member may be, for example, a rod shape or a pyramidal shape. The tip of the end of the convex member may be flat, pyramidal, inverted pyramidal with a hollow center, or tubular.

For forming a crack, it is preferable that a convex member is pressed against the surface of the alloy strip at multiple positions to form multiple cracks in the alloy strip. For example, in forming cracks, a press member on which plural convex members are regularly arranged can be used. For example, cracks can be formed by using a roll (hereinafter referred to as a cracking roll) provided with plural convex members on the peripheral surface. For example, cracks can be continuously formed by pressing a long alloy strip to a cracking roll, or by letting a long alloy strip run between the cracking rolls. It is also possible to form cracks using plural cracking rolls.

Figure 15:
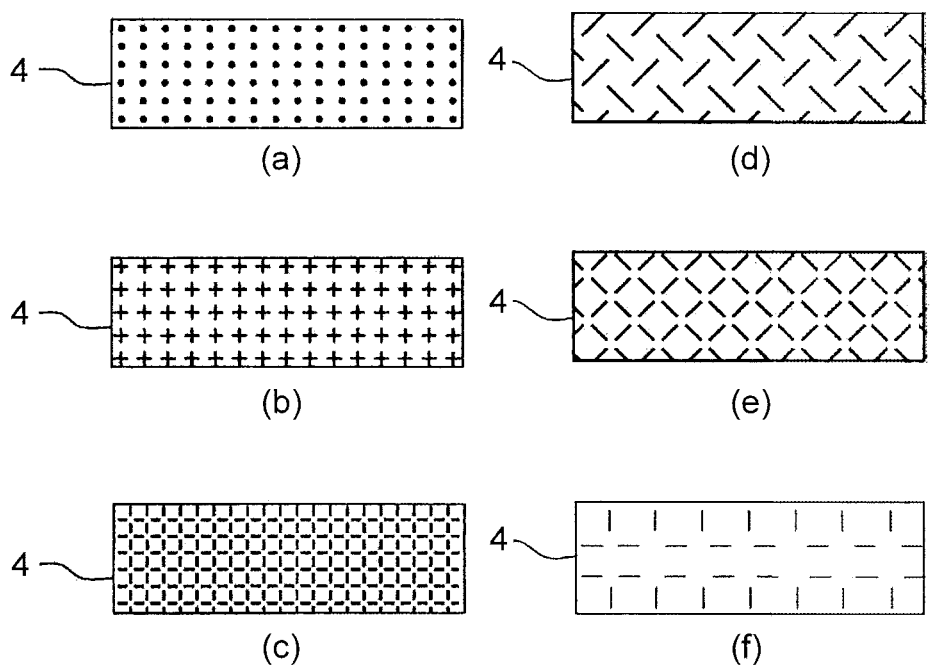
FIG. 15 is plane views of an alloy strip showing positions where an external force is applied by a convex member.

FIG. 15 is plane views of an alloy strip showing positions where an external force is applied by a convex member. The shape of the pattern in the alloy strip corresponds to the tip shape of the convex member of the part where an external force is applied.

FIG. 15 (a) shows conceptually positions where an external force is applied when a convex member having a circular cross-sectional shape at the end is used.

FIG. 15 (b) shows conceptually positions where an external force is applied when a convex member having an outer shape of cross at the end is used.

FIG. 15 (c) shows conceptually positions where an external force is applied when a convex member having a linear edge outer shape in the longitudinal direction of the diagram, and a convex member having a linear edge outer shape in the transverse direction respectively, are used. In this figure, the positions where an external force is applied are arranged discontinuously and in a matrix form.

FIG. 15 (d) shows conceptually positions where an external force is applied when a convex member having a linear edge outer shape tilted by 0° (tilted by 45° in FIG. 15 (d)) with respect to the longitudinal direction of the diagram, and a convex member having a linear edge outer shape tilted by −0° (tilted by −45° in FIG. 15 (d)) are used. In this figure, the positions where an external force is applied are each arranged discontinuously and such that the extension of one of linear positions where an external force is applied crosses between both the ends of another linear spot where an external force is applied.

FIG. 15 (e) shows conceptually positions where an external force is applied when a convex member having a linear edge outer shape tilted by 0° (tilted by 45° in FIG. 15 (e)) with respect to the longitudinal direction of the diagram, and a convex member having a linear edge outer shape tilted by −0° (tilted by −45° in FIG. 15 (e)) are used. In this figure, the positions where an external force is applied are each arranged discontinuously and in a tilted matrix form.

FIG. 15 (*f*) shows conceptually positions where an external force is applied when a convex member having a linear edge outer shape in the longitudinal direction of the diagram, and a convex member having a linear edge outer shape in the transverse direction respectively, are used. Namely, the arrangement of the convex members is modified from FIG. 15 (*c*), however not limited to that shown in the figure, and can be appropriately determined.

It is desirable that at positions where an external force is applied, exactly the same shape of cracks are formed as at the spot where the external force is applied. However, other cracks may be formed, and cracks of the same shape need not be formed (cracks are only partially formed).

Alternatively, the cracks may be made linear, and plural the cracks may be formed to be connected in a row.

In the formation of cracks using a convex member, it is preferable to form further a network crack connecting plural cracks. Specifically, in an embodiment, there is preferably a step in which a convex member is pressed against the alloy strip to form plural cracks, and then a network crack connecting the plural cracks is formed. For example, after applying an external force directly to the alloy strip with a convex member and forming cracks, the second external force can be applied by means such as bending or winding of the alloy strip. In this way, splits and/or fissures connecting the cracks with each other (magnetic gaps connecting cracks with each other) can be formed starting from the cracks as the origins of brittle fracture and/or crack fracture. In the step of forming the network crack, a network crack may be formed in the course of forming plural cracks without applying the second external force as described above.

[Production Step]

The method of producing an alloy strip laminate according to this disclosure will be described below referring to specific embodiments. First, the first embodiment will be described. FIG. 1 is a flowchart of the first embodiment.

The first embodiment is the method of producing a magnetic sheet described below.

The first embodiment is the method of producing a magnetic sheet in which plural alloy strips made of a soft magnetic material are laminated, and a crack is formed in the alloy strip. It is the method of producing a magnetic sheet including a step (Step (1) in FIG. 1) of adhering the alloy strip to an adhesive layer of a cracking tape including the adhesive layer, and a release film peelable from the adhesive layer; a step (Step (2) in FIG. 1) of forming a crack by applying an external force directly to the alloy strip; a step (Step (3) in FIG. 1) of peeling off the release film from the adhesive layer to form a sheet member including the adhesive layer and the alloy strip with the crack formed; and a step (Step (4) in FIG. 1) of laminating more than one of the above sheet members. The plural the sheet members used in the step (4) are supplied for example by repeating the sequence of steps including the step (1), step (2), and step (3) for multiple times.

In the first embodiment, in the step (1), an alloy strip is adhered to a cracking tape including an adhesive layer, and a release film peelable from the adhesive layer.

As the cracking tape, one in which the adhesive layer and the release film are integrated may be used. Similarly, one for which an adhesive layer and a release film are independently prepared and then integrated may be used.

Figure 4:
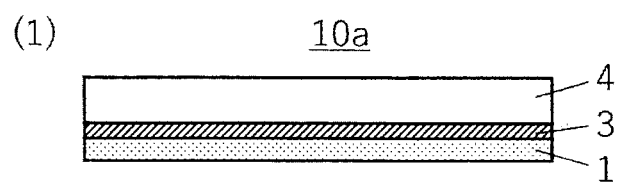
FIG. 4 is a schematic diagram showing a cross section of the laminate obtained in the step (1).

FIG. 4 is a schematic diagram showing a cross section of the laminate member 10*a* obtained in the step (1). In the laminate member 10*a*, the alloy strip 4, the adhesive layer 3, and the release film 1 are laminated.

In the first embodiment, in the step (2), an external force is applied directly to the alloy strip to form a crack.

As described above, in this disclosure, a crack is formed by applying an external force directly to the alloy strip and not after plural alloy strips are laminated but before the alloy strips are laminated. Therefore, the applied external force works directly on the alloy strip, and its strength is limited to that necessary for forming a crack in one layer of the alloy strip. As a result, a crack can be formed by a smaller external force than a conventional production method by which cracks are formed at the same time in plural alloy strips, or a conventional production method by which a crack is formed by applying an external force through a protective film. Therefore, it is possible to suppress the ruggedness of the surface of an alloy strip in which a crack is formed, and to prepare an alloy strip in an excellent plane state.

Further, since in the step (2) a crack is formed in a state where an alloy strip is adhered to a release film, generation of ruggedness itself on the surface of the alloy strip is suppressed by the elasticity of the release film, and the plane state of the alloy strip can be made excellent. Further, even when ruggedness is generated on the surface of the alloy strip, the ruggedness is deformed to be flattened due to the elasticity of the release film. As a result, a magnetic sheet having a small time-dependent change in magnetic properties can be obtained.

Figure 5:
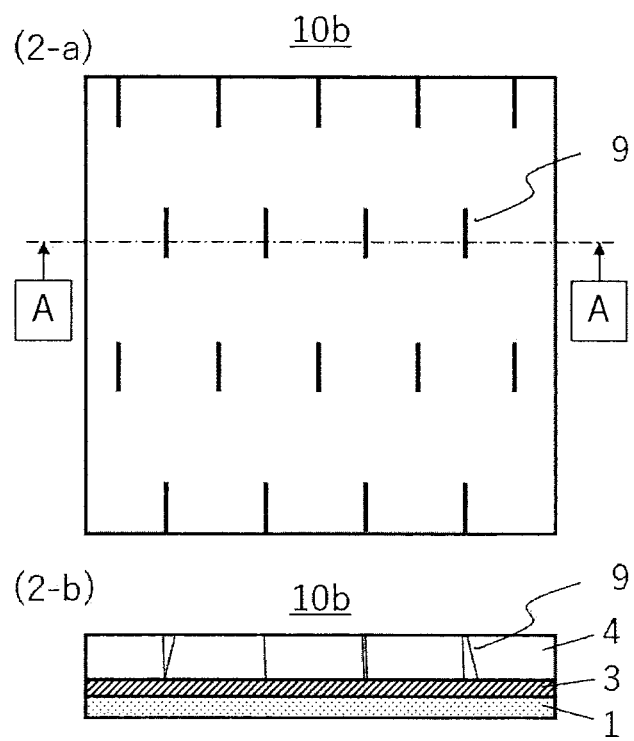
FIG. 5 is schematic diagrams showing the laminate obtained in the step (2).

FIG. 5 is schematic diagrams showing the laminate 10*b* obtained in the step (2). FIG. 5(2-*a*) is a plane view seen in the stacking direction, and FIG. 5(2-*b*) is a cross-sectional view taken along the line A-A in FIG. 5(2-*a*). In this regard, the above situation applies also to the upper diagram (*-a) and lower diagram (*-b) in FIGS. 6, 7, 10, 11, and 12 below, and the repeated description will be omitted.

In the laminate 10*b*, the alloy strip 4, the adhesive layer 3 and the release film 1 are laminated. Further, in the alloy strip 4, plural linear cracks 9 extending in the vertical direction of the figure are regularly formed. As shown in FIG. 5(2-*b*), the cracks 9 are splits and/or fissures formed in the alloy strip 4. As described above, the release film is preferably made of a resin with elasticity.

Figure 22:
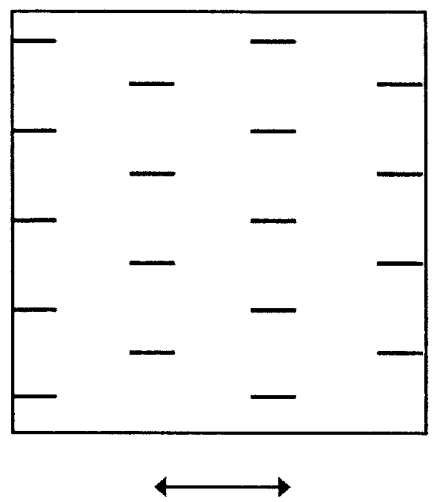
FIG. 22 is a plane view showing the state of cracks formed in the alloy strip.

When linear cracks are formed in the alloy strip, for example as shown in FIG. 22, they should preferably be formed parallel to the casting direction of the alloy strip (corresponding to the longitudinal direction in the case of continuous casting with roll cooling (quenching and solidifying), namely the rolling direction of the roll). The arrow shown in FIG. 22 indicates the casting direction.

In the first embodiment, the release film is peeled off in the step (3). The release film was not well utilized in the conventional production method, but according to this disclosure, it is utilized in the step (2) as an auxiliary member to prevent ruggedness from forming on the alloy strip, when cracks are formed by applying an external force directly to the alloy strip.

Figure 6:
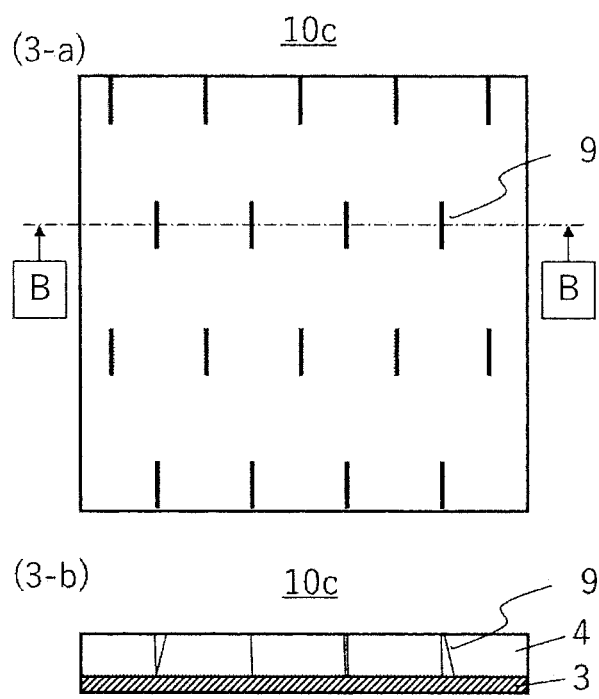
FIG. 6 is schematic diagrams showing the laminate obtained in the step (3).

FIG. 6 is schematic diagrams showing the laminate 10*c* (that is, sheet member) obtained in the step (3). In the laminate 10*c* (that is, sheet member), the alloy strip 4 and the adhesive layer 3 are laminated. The release film has been peeled off.

In the first embodiment, plural sheet members are laminated in the step (4). Since a magnetic sheet is produced by laminating the alloy strips, which are cracked in the step (2), have no or little ruggedness on the surface, and are superior in plane state, as they are, the ruggedness of the surface of the alloy strips after being made into a magnetic sheet is also small and the plane state is fine, and therefore a magnetic sheet with little time-dependent change of magnetic properties can be obtained.

FIG. 7 is schematic diagrams showing the magnetic sheet 20a (alloy strip laminate) obtained in the step (4). In the magnetic sheet 20a, plural sheet members are laminated. The plural sheet members include three second laminates (10c1 to 10c3) and a first laminate 10c4.

As shown in FIG. 7 (4-a), in the magnetic sheet 20a of this embodiment, the cracks 9 formed in the second laminate 10c1, the cracks 9-1 formed in the second laminate 10c2, and the cracks 9-2 formed in the second laminate 10c3 are formed at different positions seen in the stacking direction. In an example of this disclosure as described above, since cracks are formed by applying an external force directly to each alloy strip differently from the conventional production method by which cracks are formed in plural alloy strips at the same time, the position of the cracks can be varied from layer to layer of the alloy strip so that a magnetic sheet in which magnetic gaps are evenly formed can be prepared. Therefore, when the magnetic sheet is further processed by punching out a desired shape, cutting, or otherwise, a magnetic sheet having stable shielding characteristics with little variation in magnetic permeability depending on a processed position can be produced. Meanwhile, the crack 9-4 in the first laminate 10c4 are formed at positions overlapping with the cracks 9 formed in the second laminate 10c1.

As another step in the first embodiment, for example, a step of laminating a protective film on the second laminate 10cl can be adopted. With the protective film, it may be suppressed that cracks and a network crack may be unnecessarily increased in the alloy strip due to an unintended external force, the alloy strip may fall off, or the alloy strip may rust. In addition, the protective film functions so that unnecessary surface ruggedness is not generated when a magnetic sheet is processed into a predetermined shape.

The step of laminating a protective film can be performed in any of the steps (1) to (4).

Figure 8:
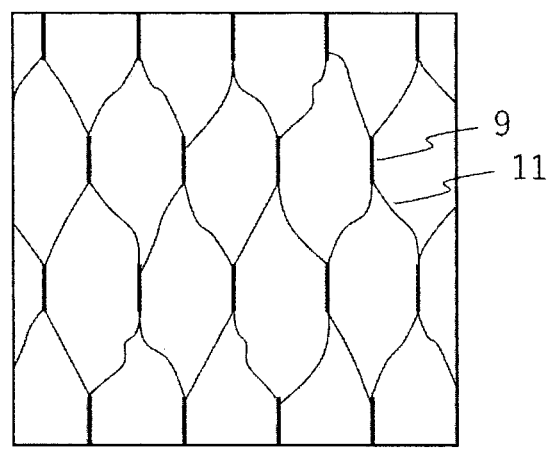
FIG. 8 is a diagram illustrating the state of splits and/or fissures of the alloy strip mutually connecting cracks (network crack).

FIG. 8 is a diagram illustrating the state of splits and/or fissures of the alloy strip connecting cracks with each other (network crack). Specifically, FIG. 8 is a schematic diagram showing the shape of the cracks 9 and network crack 11 formed on the alloy strip. When the cracks 9 are discontinuous, a second external force such as a bending or winding force may be applied to the alloy strip 4 to form splits and/or fissures in the alloy strip 4 starting from the cracks 9 as origins of brittle fractures, and to form the network crack 11 interconnecting the cracks 9 with splits and/or fissures (magnetic gaps interconnecting the cracks 9).

The network crack 11 may be formed at any time after the step (2).

Figure 13:
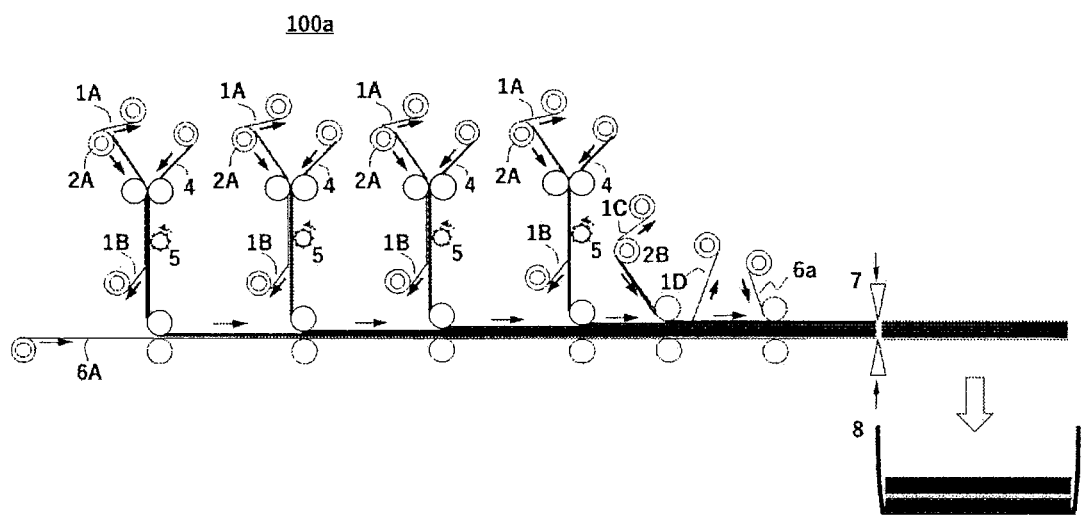
FIG. 13 is a diagram showing the production apparatus used in the first embodiment.

Next, an example of the production apparatus for a magnetic sheet used in the first embodiment and the method of producing a magnetic sheet using the above production apparatus are described by way of FIG. 13. The production apparatus for a magnetic sheet shown in FIG. 13 is provided with plural mechanisms A of adhering the alloy strip to an adhesive layer of the cracking tape including the adhesive layer and a release film peelable from the adhesive layer; plural mechanisms B of forming cracks in the alloy strip by applying an external force directly to the alloy strip adhered to the cracking tape; plural mechanisms C of forming a laminate including the adhesive layer and the alloy strip with a crack formed, by peeling off the release film; and a mechanism D of forming an alloy strip laminate by laminating plural laminates including the adhesive layer and the alloy strip with a crack formed prepared by the plural mechanisms A, the plural mechanisms B, and the plural mechanisms C. Further, the production apparatus for a magnetic sheet shown in FIG. 13 is provided with a mechanism of unwinding an alloy strip wound up in a roll shape, and a mechanism of processing a magnetic sheet. The specific product names and numerical values presented below are examples for explaining the method of producing a magnetic sheet, and the production apparatus for a magnetic sheet in detail.

Embodiment of Step (1) "Step of Adhering the Alloy Strip to an Adhesive Layer of a Cracking Tape Including the Adhesive Layer, and a Release Film Peelable from the Adhesive Layer"

First, rolls having wound up the tape 2A are placed at four locations. Thereafter the tape 2A is pulled out from the rolls. The tape 2A has a three-layer structure of a release film 1A (25 μm), an adhesive layer (5 μm), and a release film 1B (25 μm). The release film 1A and the release film 1B are made of the same material (PET), and the tensile elasticity is 3.9 GPa. The adhesive layer is a film substrate, which both sides are coated with an acrylic adhesive. The release films 1A and 1B are peelable from the adhesive layer.

The release film 1A is peeled off from the tape 2A. The release film 1A is peeled off substantially at the same timing as the tape 2A is unwound from the roll. In this embodiment, a tape composed of the adhesive layer obtained by peeling the release film 1A and the release film 1B is used as the cracking tape.

The alloy strip 4 used in the step (1) is a long alloy strip. The alloy strip 4 is wound up on a roll. The roll on which the alloy strip 4 is wound is an example of the mechanism that unwinds the alloy strip wound up in a roll shape. The alloy strip 4 is unwound from the roll and adhered to the adhesive layer of the cracking tape by the pressure roll, which is an example of the mechanism A. The alloy strip 4 is an alloy strip made of an Fe—Cu—Nb—Si—B nanocrystalline alloy (FT-3 produced by Hitachi Metals, Ltd.). In the production apparatus shown in FIG. 13, the alloy strip 4 is continuously conveyed until it is cut by the cutter 7 described later.

Embodiment of Step (2) "Step of Forming a Crack by Applying an External Force Directly to the Alloy Strip"

A crack is formed by applying an external force directly to the alloy strip 4 adhered to the cracking tape by a cracking roll 5, which is an example of the mechanism B. With respect to the cracking roll 5, plural protruding members are regularly arranged on the peripheral surface. It is also possible to place a compression roll on the release film 1B side so that it presses the alloy strip 4 towards the cracking roll not to waste the external force applied by the cracking roll in forming a crack.

Embodiment of Step (3) "Step of Peeling off the Release Film from the Adhesive Layer to Form a Sheet Member Including the Adhesive Layer and the Alloy Strip with the Crack Formed"

The release film 1B is peeled off from the adhesive layer of the cracking tape to expose the adhesive layer. By peeling off the release film 1B, a sheet member including the adhesive layer and the alloy strip in which a crack is formed is formed. Peeling off the release film 1B is executed by a roll which is an example of the mechanism C. It is also possible to form a network crack utilizing the external force to the alloy strip 4 generated at the time of peeling off the release film 1B. The production apparatus shown in FIG. 13 includes four sets of the combination of the mechanism A, mechanism B, and mechanism C for implementing the steps (1) through (3), provided that the number of sets of the combination is not limited to 4, and may be 5 or more, or 3 or less depending on the purpose.

Embodiment of Step (4) "Step of Laminating Plural Sheet Members"

Plural sheet members produced through the steps (1) to (3) are laminated respectively with compression rolls such that the adhesive layer alternates with the alloy strip to construct a magnetic sheet. The compression roll is an example of the mechanism D. The plural sheet members are laminated on the protective layer 6A.

In the first embodiment shown in FIG. 13, the protective layer 6A is adhered to one end face in the laminating direction of the magnetic sheet, and the protective film 6a is adhered to the other end face.

The protective layer 6A is adhered to the adhesive layer at one end face in the laminating direction of the magnetic sheet. The protective layer 6A has a two-layer structure of an adhesive layer with a thickness of 5 μm and a protective film with a thickness of 75 μm. This protective film is peelable from the adhesive layer. The adhesive layer of the sheet member and the adhesive layer of the protective layer are bonded by the pressure roll. When the protective film is peeled off, the adhesive layer of the protective layer is exposed, and the magnetic sheet can be attached to an electronic device, or the like.

The protective film 6a is adhered to the alloy strip at the other end face of the magnetic sheet via the adhesive layer of another tape 2B. The tape 2B has a three-layer structure of a release film 1C, an adhesive layer (5 μm), and a release film 1D. The release film 1C and the release film 1D are peelable from the adhesive layer. After the release film 1C is peeled off from the tape 2B, the exposed adhesive layer and the alloy strip are bonded by pressure rolls. After that, the release film 1D is peeled off. Thereafter, the protective film 6a is bonded with pressure to the adhesive layer of the tape 2B. The protective film 6a is a PET protective film having a thickness of 25 μm.

In the first embodiment, after the protective film 6a is laminated, the magnetic sheet is cut to a required size by the cutter 7 and conveyed to the tray 8. The cutter 7 is an example of a mechanism for processing a magnetic sheet. The sheet can be processed into a desired shape also by a processing device such as a punching die, instead of the cutter 7.

Figure 2:
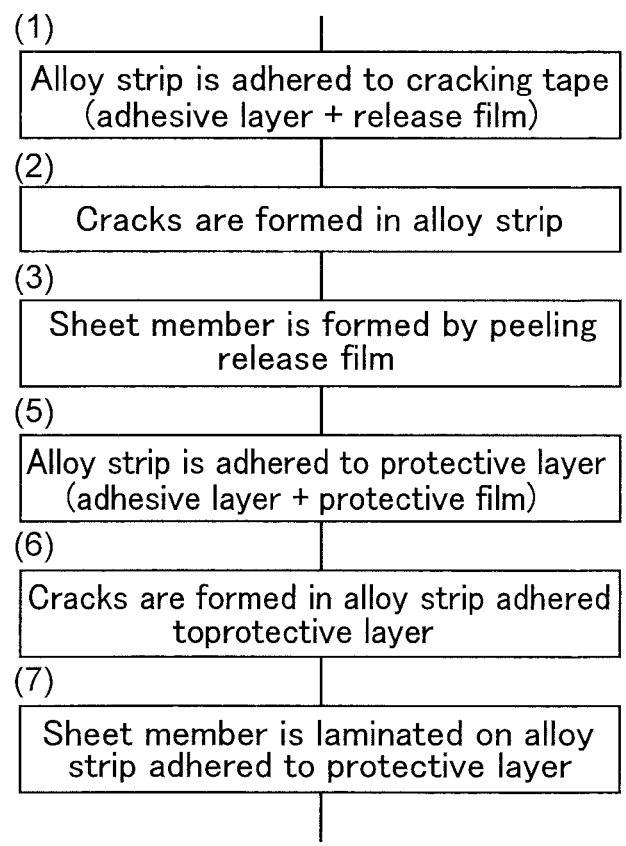
FIG. 2 is a flowchart showing the second embodiment.

The second embodiment will be described. FIG. 2 is a flowchart showing a second embodiment.

The second embodiment is a method of producing a magnetic sheet described below.

The second embodiment is a method of producing a magnetic sheet in which plural alloy strips made of a soft magnetic material are laminated, and a crack is formed in the alloy strip. It includes a step (Step (1) in FIG. 2) of adhering the alloy strip to an adhesive layer of a cracking tape including the adhesive layer, and a release film peelable from the adhesive layer; a step (Step (2) in FIG. 2) of forming a crack by applying an external force directly to the alloy strip; a step (Step (3) in FIG. 2) of peeling off the release film from the adhesive layer to form a sheet member including the adhesive layer and the alloy strip with the crack formed; a step (Step (5) in FIG. 2) of adhering the alloy strip to the adhesive layer of the protective layer including the adhesive layer and the protective film; a step (Step (6) in FIG. 2) of forming a crack by applying an external force directly to the alloy strip adhered to the protective layer; and a step (Step (7) in FIG. 2) of laminating the sheet member on the alloy strip adhered to the protective layer.

The second embodiment has the same steps (1) through (3) as those in the first embodiment.

The description of steps (1) through (3) will be omitted.

In the second embodiment, in the step (5), the alloy strip is adhered to the adhesive layer of the protective layer including the adhesive layer and the protective film.

As the protective layer, one in which an adhesive layer and a protective film are integrated may be used, or one for which an adhesive layer and a protective film are independently prepared and then integrated may be used.

The step (5) can also be performed at the same time with steps (1) through (3).

FIG. 9 is a schematic diagram showing a cross section of the laminate member 10d prepared in the step (5). In the laminate member 10d, the alloy strip 4' and the protective layer 6 composed of the adhesive layer 6b and the protective film 6a are laminated.

As the protective layer, commercially available one in which an adhesive layer and a protective film are integrated may be used, or one for which an adhesive layer and a protective film are independently prepared and then integrated may be used.

The materials for the adhesive layer of the protective layer and the protective film are the same as described above.

In the second embodiment, a crack is formed in the step (6) by applying an external force directly to the alloy strip adhered to the protective layer.

As described above, in this disclosure, a crack is formed by applying an external force directly to the alloy strip and not after alloy strips are laminated but before the alloy strips are laminated. Therefore, the applied external force works directly on the alloy strip, and its strength is limited to that necessary for forming a crack in one layer of the alloy strip. As a result, a crack can be formed by a smaller external force than a conventional production method by which cracks are formed at the same time in plural alloy strips, or a conventional production method by which a crack is formed by applying an external force through a protective film. Since the external force for forming a crack is small, it is possible to suppress the ruggedness of the surface of an alloy strip with a crack formed, and to prepare an alloy strip in an excellent plane state.

Further, since in the step (6) a crack is formed in a state where an alloy strip is adhered to a protective film, generation of ruggedness itself on the surface of the alloy strip is suppressed by the elasticity of the protective film, and the plane state of the alloy strip can be made excellent. Further, even when ruggedness is generated on the surface of the alloy strip, the ruggedness is deformed to be flattened due to the elasticity of the protective film. As a result, a magnetic sheet (alloy strip laminate) having a small time-dependent change in magnetic properties can be obtained.

FIG. 10 is schematic diagrams showing the first laminate 10e prepared in the step (6). In the alloy strip 4', plural linear cracks 9' extending in the vertical direction of the figure are regularly formed. As shown in FIG. 10 (6-b), the cracks 9' are splits and/or fissures formed in the alloy strip 4'.

The protective film is preferably a protective film made of a resin having elasticity. The tensile modulus of elasticity of the resin, a preferable range of the thickness, and the type of the resin of the protective film are as described above.

In the second embodiment, in the step (7), the sheet member prepared in the steps (1) through (3) (that is, the second laminate 10c3) is laminated on the alloy strip adhered to the protective layer. Both the alloy strip of the sheet member and the alloy strip adhered to the protective layer are alloy strips superior in the plane state having no or little ruggedness on the surface. Since such alloy strips are laminated as they are, the alloy strips after being formed into a magnetic sheet have little ruggedness on the surface and are superior in the plane state, so that the magnetic sheet having a small time-dependent change in magnetic properties can be obtained.

FIG. 11 is schematic diagrams of the magnetic sheet 20b prepared in the step (7). As shown in FIG. 11 (7-a), in the magnetic sheet 20b, the second laminate 10c3 is laminated on the alloy strip 4' adhered to the protective layer 6. In the magnetic sheet 20b, the cracks 9 formed in the alloy strip 4 of the second laminate 10c3 and the cracks 9' formed in the alloy strip 4' adhered to the protective layer 6 are formed at different positions seen in the stacking direction. In this disclosure, since cracks are formed by applying an external force directly to each alloy strip differently from the conventional production method by which cracks are formed in plural alloy strips at the same time, the position of the cracks can be varied from layer to layer of the alloy strip so that a magnetic sheet in which magnetic gaps are evenly formed can be prepared. Therefore, when the magnetic sheet is further processed by punching out a desired shape, cutting, or otherwise, a magnetic sheet having stable shielding characteristics with little variation in magnetic permeability depending on a processed position can be produced. The magnetic sheet can be laminated with another protective film or protective layer on the surface opposite to the protective layer 6 in the laminating direction. In either protective layer, a release film peelable from the adhesive layer can be used as the protective film.

Also in the second embodiment, the network crack 11 can be formed identically as described in connection with FIG. 8.

Figure 3:
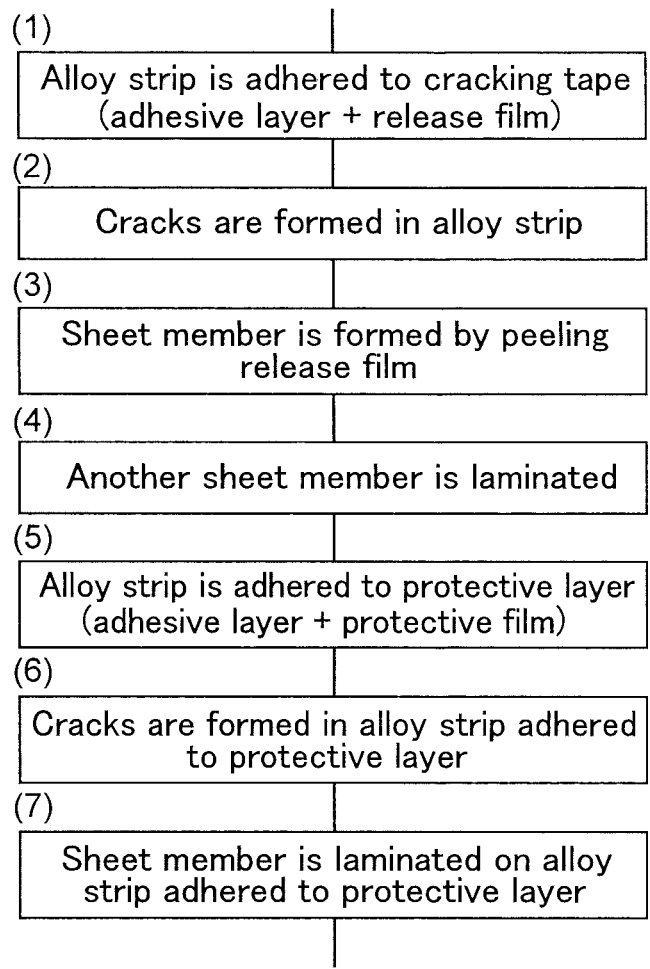
FIG. 3 is a flowchart showing a variant of the second embodiment.

In the second embodiment, a step of laminating the sheet member with another sheet member (step (4) of FIG. 3) can be performed. In this step of laminating the sheet member with another sheet member (step (4)) may be a step of laminating a sheet member on an alloy strip adhered to a protective layer, and then further laminating on the sheet member another sheet member. In this case, the step (4) is performed next after the step (7) in the flowchart shown in FIG. 2.

As another method, after laminating plural sheet members, the laminate of the sheet members may be laminated on the alloy strip adhered to the protective layer. FIG. 3 is a flowchart of this method.

In the flowchart of FIG. 3, the step (4) of the first embodiment is performed after the step (3) of the second embodiment. The description of each step is the same as described above.

Not limited to the above, the procedure for laminating the alloy strip may be set each time.

Figure 12:
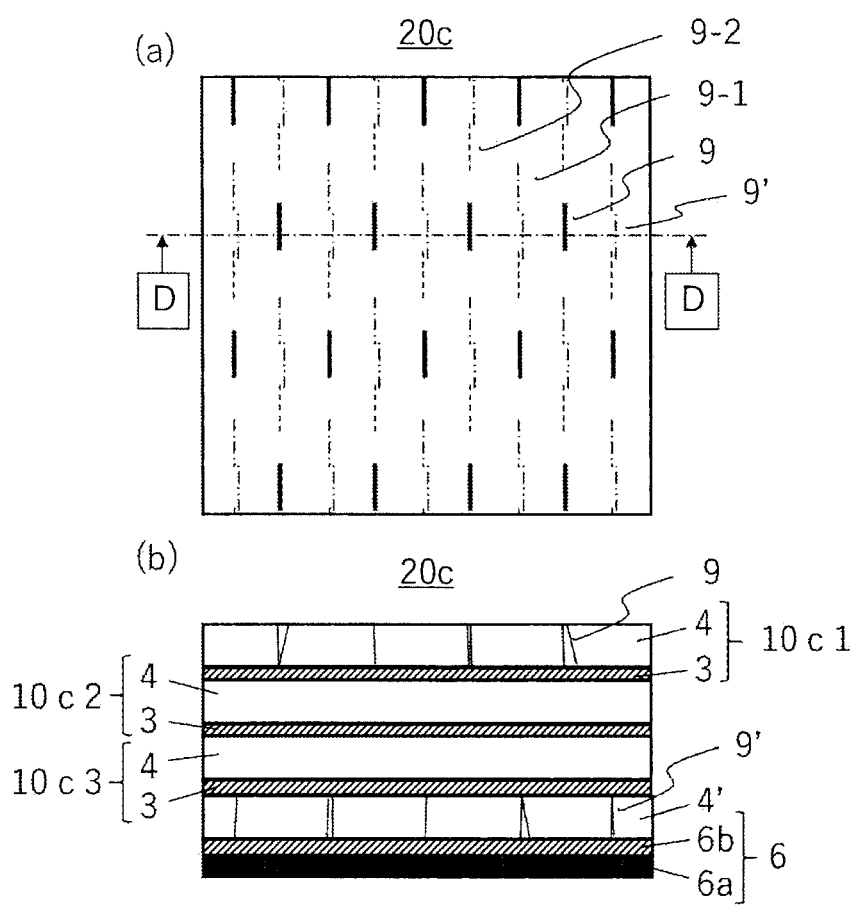
FIG. 12 is schematic diagrams showing another magnetic sheet obtained in the second embodiment.

FIG. 12 is schematic diagrams illustrating another magnetic sheet to be obtained in the second embodiment. Specifically, the magnetic sheet shown in FIG. 12 is prepared by the steps shown in the flowchart of FIG. 3. As shown in FIG. 12 (a), the magnetic sheet 20c is formed by laminating the second laminate 10c1 to the second laminate 10c3 on the alloy strip 4' adhered to the protective layer 6. In the magnetic sheet 20c, the cracks 9, cracks 9-1, and cracks 9-2 formed respectively in the second laminate 10c1 through the second laminate 10c3, and the cracks 9' formed in the alloy strip 4' adhered to the protective layer 6 are formed at different positions seen in the stacking direction. As described above, since, in this disclosure, cracks are formed by applying an external force directly to each alloy strip differently from the conventional production method by which cracks are formed in plural alloy strips at the same time, the position of the cracks can be varied from layer to layer of the alloy strip so that a magnetic sheet in which magnetic gaps are evenly formed can be prepared. Therefore, when the magnetic sheet is further processed by punching out a desired shape, cutting, or otherwise, a magnetic sheet having stable shielding characteristics with little variation in magnetic permeability depending on a processed position can be produced.

In the magnetic sheet 20c, another protective film or protective layer can be laminated on the surface opposite to the protective layer 6 in the laminating direction. In either of protective layer, a release film peelable from the adhesive layer can be used as the protective film.

Figure 14:
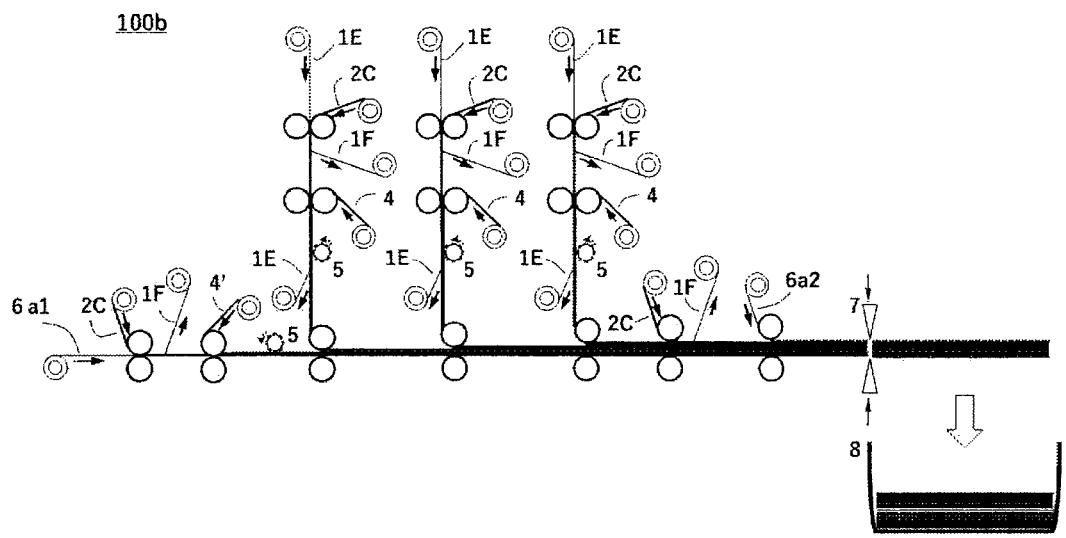
FIG. 14 is a diagram showing the production apparatus used in the second embodiment.

Next, an example of a production apparatus for a magnetic sheet to be used in the second embodiment will be described with reference to FIG. 14. The production apparatus for a magnetic sheet shown in FIG. 14 has the same mechanisms as the mechanisms included in the production apparatus for a magnetic sheet shown in FIG. 13. As the second embodiment, the production method of the process shown in FIG. 2 will be described.

Embodiment of Step (1) "Step of adhering an Alloy Strip to an Adhesive Layer of a Cracking Tape Including the Adhesive Layer, and a Release Film Peelable from the Adhesive Layer"

First, rolls having wound up the release film 1E are placed at three locations. Further, rolls having wound up the tape 2C for adhering an adhesive layer to the release film 1E are placed at three locations. The tape 2C has a two-layer structure of an adhesive layer (5 μm) and a release film 1F (25 μm). The release film 1E and the release film 1F are made of the same material (PET), and the tensile elasticity is 3.9 GPa.

Then, the release films 1E and the tape 2C are unwound from the roll, and adhered by the pressure roll. The adhesive layer is a film substrate, which both sides are coated with an acrylic adhesive. The release films 1F is peelable from the adhesive layer. The release film 1E is peelable after being adhered to the adhesive layer.

Thereafter, the release film 1F is peeled off from the adhesive layer. In this embodiment, a tape composed of the adhesive layer obtained by peeling off the release film 1F and the release film 1E is used as the cracking tape.

Then, the alloy strip 4 is unwound from the roll, and adhered to the exposed adhesive layer by the pressure roll. The alloy strip 4 is an alloy strip made of an Fe—Cu—Nb—Si—B nanocrystalline alloy (FT-3 produced by Hitachi Metals, Ltd.).

Embodiment of Step (2) "Step of Forming a Crack by Applying an External Force Directly to the Alloy Strip"

A crack is formed by applying an external force directly to the alloy strip 4 adhered to the cracking tape by a cracking roll 5, in which plural protruding members are regularly arranged on the peripheral surface. It is also possible to place a compression roll on the release film 1E side so as not to waste the external force applied by the cracking roll 5 in forming a crack.

Embodiment of Step (3) "Step of Peeling off the Release Film from the Adhesive Layer to Form a Sheet Member Including the Adhesive Layer and the Alloy Strip with a Crack Formed"

The release film 1E is peeled off from the adhesive layer of the cracking tape to expose the adhesive layer. It is also possible to form a network crack utilizing the external force to the alloy strip 4 generated at the time of peeling off the release film 1E.

Embodiment of Step (5) "Step of Adhering the Alloy Strip to the Adhesive Layer of the Protective Layer Including the Adhesive Layer and the Protective Film"

First, a roll having wound up the protective film 6a1 is placed. In the vicinity of the roll having wound up the protective film 6a1, a roll having wound up the tape 2C is placed. The protective film 6a1 and the tape 2C are unwound from the roll, and the protective film 6a1 is adhered to the adhesive layer of the tape 2C by the pressure roll. As described above, the tape 2C has a two-layer structure of an adhesive layer (5 μm) and a release film 1F (25 μm).

The materials for the release film 1F and the protective film 6a1 are the same material (PET), and the tensile elasticity is 3.9 GPa. As the adhesive layer, a film substrate which both sides are coated with an acrylic adhesive is used.

The release film 1F is peelable from the adhesive layer. The protective film 6a1 can be peeled off after being adhered to the adhesive layer.

After that, the release film 1F is peeled off from the tape 2C. In this embodiment, the tape composed of the adhesive layer thus obtained and the protective film 6a1 is used as the protective layer.

Thereafter the alloy strip 4' is unwound from the roll and adhered to the exposed adhesive layer by the pressure roll. The alloy strip 4' may be made of the same material as the alloy strip 4, or may be different.

Embodiment of Step (6) "Step of Forming Cracks by Applying an External Force Directly to the Alloy Strip Adhered to the Protective Layer"

Cracks are formed by applying an external force directly to the alloy strip 4' adhered to the protective layer 6a1 by the cracking roll 5 in which plural protruding members are regularly arranged on the peripheral surface. At this time, it is also possible to place a compression roll on the protective film 6a1 side so as not to waste the external force applied by the cracking roll 5.

Embodiment of Step (7) "Step of Laminating a Sheet Member on the Alloy Strip Adhered to the Protective Layer"

The sheet member prepared in steps (1) through (3) is laminated on the alloy strip 4' adhered to the adhesive layer of the protective layer.

In this embodiment, one sheet member is first adhered to the alloy strip 4' adhered to the protective layer, and then two other sheet members are laminated in sequence.

In the second embodiment, the protective film 6a2 (thickness 10 μm) is adhered to the end face in the laminating direction opposite to the end face to which the protective film 6a1 is adhered.

The tape 2C is adhered to the magnetic sheet prepared in the step (7). After that, the release film 1F is peeled off from the tape 2C, to obtain a magnetic sheet having an adhesive layer for the protective film formed on the outermost layer. Then, the protective film 6a2 is adhered to this adhesive layer.

As the protective film 6a1 and the protective film 6a2, those peelable after being adhered to the adhesive layer of the protective layer can also be used. In that case, when the protective film is peeled off, the adhesive layer of the protective layer is exposed so that it becomes possible to stick it to an electronic device to be magnetically shielded.

In the second embodiment, after the protective film 6a2 is laminated, the magnetic sheet is cut to a required size by the cutter 7 and conveyed to the tray 8. Instead of the cutter 7, the film can be processed into a desired shape by punching.

Figure 16:
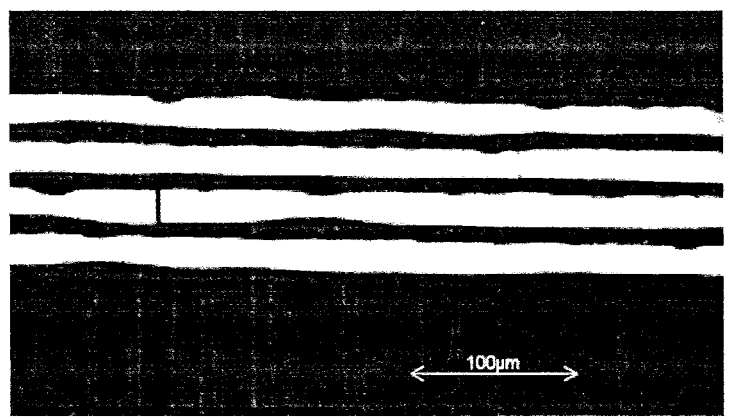
FIG. 16 is a cross-sectional photograph showing an example of the magnetic sheet obtained by the method of producing an alloy strip laminate according to this disclosure.

FIG. 16 is a cross-sectional photograph showing an example of a magnetic sheet obtained by the method of producing an alloy strip laminate according to this disclosure. In the photograph, the white parts are the alloy strips, and the gray parts between the alloy strips are the adhesive layers. Further, there are adhesive layers or protective layers of the sheet member on the outer sides in the laminating direction of the four-layer alloy strip.

In the alloy strips of the first to third layers from the bottom, the presence of splits or fissures can be observed, and therefore presence of magnetic gaps can be known. Further, there is substantially no ruggedness (three-dimensional structure protruding from the surface) on any of the surfaces of the alloy strips, and the plane states of the alloy strips are excellent. In addition, the plane state of the magnetic sheet, which is a four-layer laminate, is also excellent.

Figure 18:
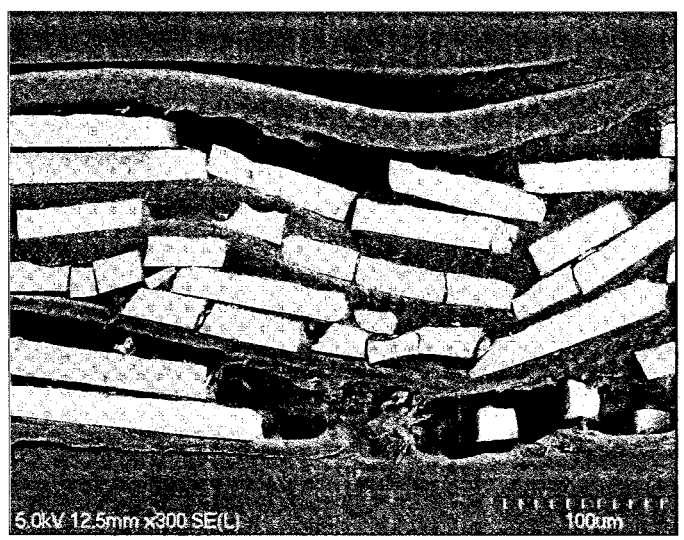
FIG. 18 is a cross-sectional photograph of a magnetic sheet obtained by the conventional production method.

FIG. 18 is a cross-sectional photograph showing a magnetic sheet obtained by the conventional production method (a production method by which plural alloy strips are laminated and then an external force is applied to form cracks). In the conventional magnetic sheet, the alloy strips are wavily deformed, and the adhesive layers and the outer protection layer are also wavily deformed.

Figure 17:
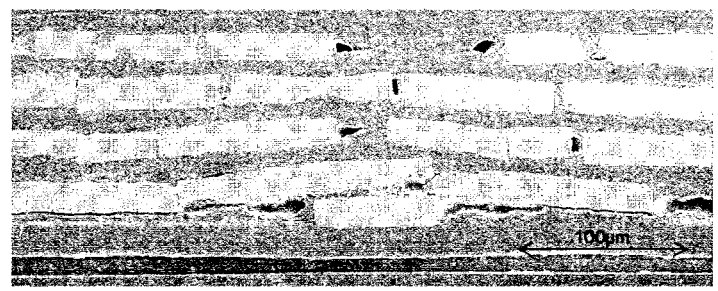
FIG. 17 is a cross-sectional photograph of a magnetic sheet obtained by the conventional production method.

FIG. 17 is a cross-sectional photograph showing a magnetic sheet obtained by the conventional production method. Specifically, the magnetic sheet shown in FIG. 17 is a magnetic sheet which was obtained by pressing the magnetic sheet of FIG. 18 from both sides with flat platy members for planarization. In the magnetic sheet of FIG. 17, the alloy strips are arranged flatter than in the magnetic sheet of FIG. 18. However, in the lower central part of the photograph, the lowest alloy strip has a double structure in which the alloy strip protrudes from the surface.

Figure 19:
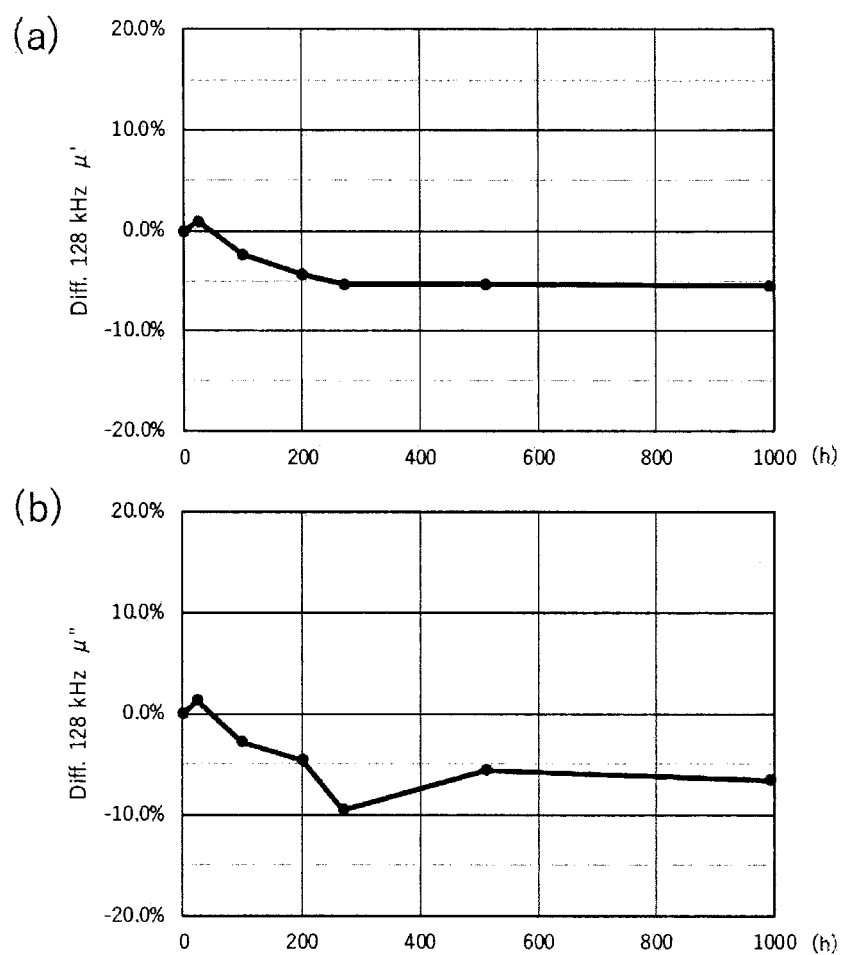
FIG. 19 is graphs showing the changes in magnetic permeability when a conventional magnetic sheet is left to stand after its production.

FIG. 19 is graphs showing changes in the magnetic permeability when a conventional magnetic sheet is left to stand after production. Specifically, the alternating current relative magnetic permeability is measured starting immediately after the production of a conventional magnetic sheet defined as 0 hour until elapse of 1000 hours in the air at 70° C. to find the rate of change from the value at 0 hour. and the results are shown in FIG. 19. In FIG. 19, (a) is a graph showing the real number (real part) $\mu r'$ of the alternating current relative magnetic permeability $\mu r$, and (b) is a graph showing the imaginary number (imaginary part) $\mu r''$ of the alternating current relative magnetic permeability $\mu r$. In the measurement shown in FIG. 19, a magnetic sheet prepared by the conventional production method (a production method by which plural alloy strips are laminated and then an external force is applied to form cracks).

In the measurement of the alternating current relative magnetic permeability $\mu r$, the impedance (Z) and the inductance ($L_S$) of a series equivalent circuit are measured using an impedance analyzer (E4990A with measuring tool: 16454A, manufactured by Keysight Technologies, Inc.) at an OSC level of 0.03 V, a temperature of 25° C., and with a frequency of 128 kHz, and the alternating current relative magnetic permeability $\mu r$ is calculated according to the following equation, wherein as the evaluation sample, a stack of 10 to 20 sheets of punched-out specimens in a ring form with an outer diameter of 20 mm and an inner diameter of 9 mm is used.

$$\mu = 2\pi \times Z / (2\pi \times \mu \times f \times t \times n \times \ln(OD/ID))$$

Z: Absolute value of impedance
f: Frequency (Hz)
t: Strip thickness (m)
n: Number of layers μ: Vacuum permeability ($4 \times \pi \times 10^{-7}$ H/m)
OD: Outer diameter (m)

ID: Inner diameter (m)

As shown in FIG. 19, with respect to the magnetic sheet obtained by the conventional production method, the time-dependent change in the alternating current relative magnetic permeability μr is significant.

[Wireless Charging Device]

Figure 20:
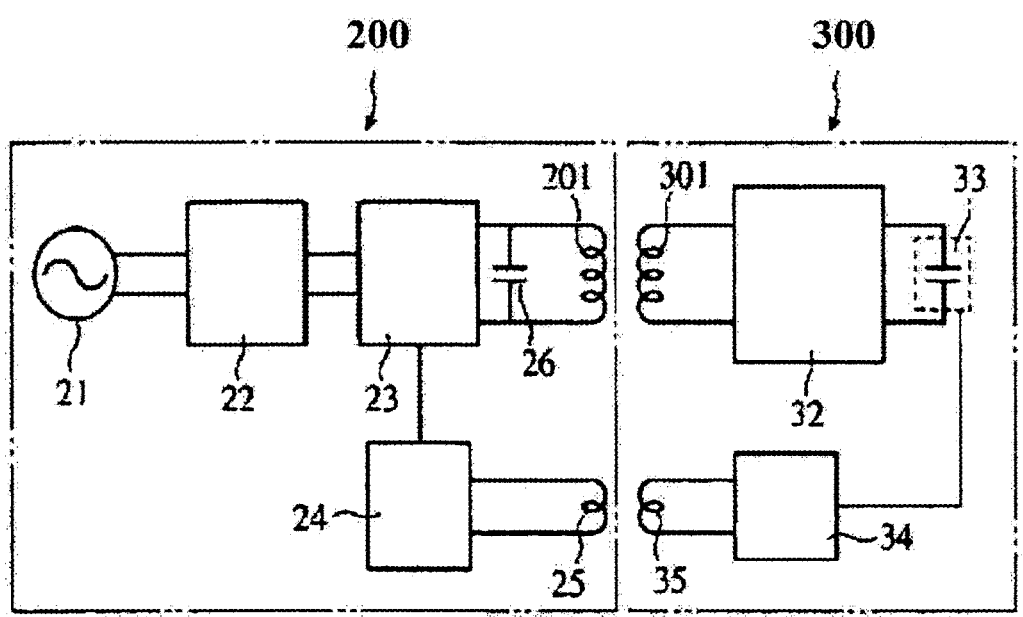
FIG. 20 is an outline diagram of a wireless charging device.

As an example of the application of the magnetic sheet of this disclosure, an example of a wireless charging device is shown. The wireless charging device has, for example, the circuit configuration shown in FIG. 20. The power supply device 200 includes a power supply unit 21 that supplies alternating current, a rectifier circuit. 22 that is connected to the power supply unit 21 to rectify alternating current into direct current, a switching circuit 23 that converts input direct current to high-frequency current with a predetermined frequency, a primary coil 201 connected to the switching circuit 23 so that the high-frequency current flows, a resonant capacitor 26 connected to the switching circuit 23 in parallel with the primary coil 201 so as to resonate at the same frequency, a control circuit 24 connected to the switching circuit 23, and a control primary coil 25 connected to the control circuit 24. The control circuit 24 controls the action of the switching circuit 23 based on the induced current obtained from the control primary coil 25.

The power receiving device 300 includes a secondary coil 301 that receives a magnetic flux generated from the primary coil 201, a rectifier circuit. 32 connected to the secondary coil 301, a secondary battery 33 connected to the rectifier circuit 32, a battery control circuit 34 connected to the secondary battery 33 for detecting the power storage status from the voltage of the secondary battery 33, and a control secondary coil 35 connected to the battery control circuit 34. The secondary coil 301 may be in parallel connected with a resonant capacitor (not illustrated). A rectified current is stored in the secondary battery 33, or utilized, for example, in an electronic circuit or a driving member (not illustrated). The battery control circuit 34 sends a signal for optimal charging according to the power storage status of the secondary battery 33 to the control secondary coil 35. For example, when the secondary battery 33 is fully charged, a signal of that information is sent to the secondary coil 35, and the signal was transmitted to the control circuit 24 of the power supply device 200 via the control primary coil 25 that is electromagnetically coupled to the secondary coil 35. The control circuit 24 stops the switching circuit 23 based on the signal.

In the power supply device, the magnetic sheet of this disclosure is used, for example, between the primary coil 201 and other electronic members of the power supply device, and between the control primary coil 25 and other electronic members of the power supply device. In the power receiving device, the magnetic sheet of this disclosure is used, for example, between the secondary coil 301 and other electronic members of the power receiving device, and between the control secondary coil 35 and other electronic members of the power supply device.

EXAMPLES

This disclosure will be described in detail below by way of Examples. However, this disclosure is not limited to the following Examples.

Example 1

A magnetic sheet was produced using a production apparatus including the components shown in FIG. 13. The production method (including conditions, and materials) for the magnetic sheet is the same as that of the first embodiment described above. Specific conditions and materials are shown below.

Alloy strip: FT-3 (produced by Hitachi Metals, Ltd.)
Alloy strip thickness: 16 μm
Alloy strip width: 60 mm
Number of layers: 4
Cracking roll pressure: 0.3 MPa
Magnetic sheet size: 50 mm×50 mm Example 2

A magnetic sheet was produced by the same procedure as in Example 1.
<Evaluation>

The alternating current relative magnetic permeability μr (128 kHz) of each magnetic sheet was evaluated. The evaluation results are shown in Table 1.

TABLE 1

|  | Initial | After 300 days | Rate of change |
| --- | --- | --- | --- |
| Example 1 | 1,085 | 1,053 | 3.0% |
| Example 2 | 1,009 | 1,029 | −2.0% |

As shown in Table 1, in Examples 1 and 2, the rates of change after 300 days (after 7200 hours) were within +3.0%. On the other hand, with respect to the magnetic sheet produced by the conventional production method (four-layer alloy strips laminated through adhesive layers are sandwiched between two resin films, and cracks are formed by applying an external force through the resin films), the rate of change after 100 hours was 7% to 10%. The above results indicate that in Examples 1 and 2, magnetic sheets having a small change in magnetic permeability were obtained.

The disclosure of Japanese Patent Application No. 2019-095278 filed on May 21, 2019 and the disclosure of Japanese Patent Application No. 2019-095279 filed on May 21, 2019 are incorporated herein by reference in their entirety. All the literature, patent application, and technical standards cited herein are also herein incorporated to the same extent as provided for specifically and severally with respect to an individual literature, patent application, and technical standard to the effect that the same should be so incorporated by reference.

REFERENCE SIGNS LIST 1, 1A, 1B, 1C, 1D, 1E, 1F: Release film
2, 2A, 2B, 2C: Tape
3: Adhesive layer
4, 4', 110: Alloy strip
5: Cracking roll
6, 6A: Protective layer
6a, 6a1, 6a2: Protective film
6b: Adhesive layer
7: Cutter
8: Tray
9, 9', 9-1, 9-2: Crack
10a, 10d: Laminate member
10b, 10c: Laminate
10c4, 10e: First laminate
10c1, 10c2, 10c3: Second laminate
11: Network crack
20a, 20b, 20c: Magnetic sheet 200: Power supply device
21: Power supply unit
22: Rectifier circuit
23: Switching circuit
24: Control circuit
25: Control primary coil
26: Resonant capacitor
201: Primary coil
300: Power receiving device
32: Rectifier circuit.
33: Secondary battery
34: Battery control circuit
35: Control secondary coil
41, 42, 43A, 43B, 44A, 44B, 45A, 45B, 46A, 46B, 47, 48, 49, 50: Guide roller
60, 62: Dancer roller
301: Secondary coil
111: Wound body
112: Unwinding roller
114: Winding roller
120: Heating chamber
122: Heating plate
122S: First plane surface
130: Cooling chamber
132: Cooling plate
132S: Second plane surface
150: In-line annealing device
100a: Production apparatus
100b: Production apparatus

The invention claimed is:

1. A method of producing an alloy strip laminate, comprising:
    applying an external force directly to an alloy strip of a first laminate member, the first laminate member comprising an adhesive layer and the alloy strip, to form a crack in the alloy strip and prepare a first laminate comprising the adhesive layer and the alloy strip with the crack formed therein;
    applying an external force directly to an alloy strip of a second laminate member, the second laminate member comprising an adhesive layer and the alloy strip, to form a crack in the alloy strip and prepare at least one second laminate comprising the adhesive layer and the alloy strip with the crack formed therein; and
    laminating the at least one second laminate on the first laminate to prepare an alloy strip laminate in which the adhesive layers, and the alloy strips with the crack formed therein are alternately layered;
    wherein forming the crack comprises pressing a convex member against a plurality of positions on a surface of the alloy strip to form a plurality of cracks in the alloy strip, and forming network cracks mutually connecting the plurality of cracks formed by pressing the convex member against the alloy strip due to a force in a longitudinal direction only, and
    wherein the forming network cracks comprises applying a second external force by bending or winding of the alloy strip after one-time forming a plurality of cracks in the alloy strip.

2. The method of producing an alloy strip laminate according to claim 1, wherein preparing the at least one second laminate comprises:
    adhering the alloy strip to an adhesive layer of a cracking tape, the cracking tape comprising the adhesive layer and a release film that is peelable from the adhesive layer, to prepare a second laminate member comprising the release film, the adhesive layer, and the alloy strip;
    applying an external force directly to the alloy strip of the second laminate member to form a crack in the alloy strip; and
    peeling off the release film to prepare a second laminate comprising the adhesive layer and the alloy strip with the crack formed therein.

3. The method of producing an alloy strip laminate according to claim 2, wherein preparing the first laminate comprises:
    adhering the alloy strip to an adhesive layer of a cracking tape, the cracking tape comprising the adhesive layer and a release film that is peelable from the adhesive layer, to prepare a first laminate member comprising the release film, the adhesive layer, and the alloy strip;
    applying an external force directly to the alloy strip of the first laminate member to form a crack in the alloy strip; and
    peeling off the release film to prepare a first laminate comprising the adhesive layer and the alloy strip with the crack formed.

4. The method of producing an alloy strip laminate according to claim 3, wherein the release film is made of a resin.

5. The method of producing an alloy strip laminate according to claim 1, wherein the adhesive layer is a film substrate, both sides of which are coated with an adhesive.

6. The method of producing an alloy strip laminate according to claim 1, further comprising laminating the first laminate on a protective layer having an adhesive layer and a protective film.

7. The method of producing an alloy strip laminate according to claim 6, wherein the protective film is made of a resin.

8. The method of producing an alloy strip laminate according to claim 1, wherein preparing the first laminate further comprises:
    adhering the alloy strip to an adhesive layer of a protective layer, the protective layer comprising the adhesive layer and a protective film, to prepare a first laminate member comprising the protective film, the adhesive layer, and the alloy strip; and
    applying an external force directly to the alloy strip of the first laminate member to form a crack in the alloy strip and prepare a first laminate having the protective film, the adhesive layer, and the cracked alloy strip layered in this order.

9. The method of producing an alloy strip laminate according to claim 1, further comprising:
    adhering a protective film to one end face or both end faces in a laminating direction of the alloy strip laminate.

10. The method of producing an alloy strip laminate according to claim 1, wherein preparing the at least one second laminate comprises:
    applying an external force directly to the alloy strip, in a state in which a release film, which is peelable from the adhesive layer, is disposed at an opposite face of the adhesive layer from a face at which the alloy strip is disposed, to form the crack in the alloy strip; and
    peeling off the release film.

11. The method of producing an alloy strip laminate according to claim 1, wherein preparing the first laminate comprises forming the crack in the alloy strip by applying an external force directly to the alloy strip, in a state in which a protective film or a release film, which is peelable from the adhesive layer, is disposed at an opposite face of the adhesive layer from a face at which the alloy strip is disposed.

12. The method of producing an alloy strip laminate according to claim 1, wherein the alloy strip is a nanocrystalline alloy strip.

13. The method of producing an alloy strip laminate according to claim 12, wherein the nanocrystalline alloy strip is prepared by performing a heat treatment for nanocrystallization in a state in which a tensional force is applied to an amorphous alloy strip capable of nano crystallization.

14. The method of producing an alloy strip laminate according to claim 12, wherein the nanocrystalline alloy strip has a composition represented by the following Formula:

$$(Fe_{1-a}M_a)_{100-x-y-z-\alpha-\beta-\gamma}Cu_xSi_yB_zM'_\alpha M''_\beta X_\gamma (atom\ \%)$$

wherein, in the Formula, M represents at least one of Co or Ni; M' represents at least one element selected from the group consisting of Nb, Mo, Ta, Ti, Zr, Hf, V, Cr, Mn, and W; M" represents at least one element selected from the group consisting of Al, platinum group elements, Sc, rare earth elements, Zn, Sn, and Re; X represents at least one element selected from the group consisting of C, Ge, P, Ga, Sb, In, Be, and As; and a, x, y, z, α, β, and γ respectively satisfy $0 \leq a \leq 0.5$, $0.1 \leq x \leq 3$, $0 \leq y \leq 30$, $0 \leq z \leq 25$, $5 \leq y+z \leq 30$, $0 \leq \alpha \leq 20$, $0 < \beta \leq 20$, and $0 \leq \gamma \leq 20$.

15. The method of producing an alloy strip laminate according to claim 1, wherein the alloy strip laminate obtained by laminating the at least one second laminate on the first laminate is a long alloy strip laminate, and the method further comprises winding the long alloy strip laminate into a roll shape after preparing the alloy strip laminate.

16. The method of producing an alloy strip laminate according to claim 15, further comprising unwinding the long alloy strip laminate from the roll shape and cutting the unwound long alloy strip laminate.

17. The method of producing an alloy strip laminate according to claim 1, wherein the alloy strip laminate obtained by laminating the at least one second laminate on the first laminate in preparing the alloy strip laminate is a long alloy strip laminate, and the method further comprises processing the long alloy strip laminate after preparing the alloy strip laminate.

18. The method of producing an alloy strip laminate according to claim 1, wherein the adhesive layer is a film substrate, both sides of which are coated with an adhesive, and the method further comprises laminating the first laminate on a protective layer having an adhesive layer and a protective film, wherein preparing the first laminate comprises:
  adhering an alloy strip to the adhesive layer of the protective layer to prepare a first laminate member comprising the protective film, the adhesive layer, and the alloy strip; and
  applying an external force directly to the alloy strip of the first laminate member to form a crack in the alloy strip and prepare a first laminate having the protective film, the adhesive layer, and the cracked alloy strip layered in this order.

19. The method of producing an alloy strip laminate according to claim 18, further comprising adhering a protective film to one end face or both end faces in a laminating direction of the alloy strip laminate, wherein the protective film is made of a resin.

20. The method of producing an alloy strip laminate according to claim 19, wherein:
  preparing the first laminate further comprises forming the crack in the alloy strip by applying an external force directly to the alloy strip, in a state in which the protective film or a release film, which is peelable from the adhesive layer, is disposed at an opposite face of the adhesive layer from a face at which the alloy strip is disposed,
  preparing the second laminate further comprises:
  applying an external force directly to the alloy strip, in a state in which a release film, which is peelable from the adhesive layer, is disposed at an opposite face of the adhesive layer from a face at which the alloy strip is disposed, to form the crack in the alloy strip, and
  peeling off the release film.

21. The method of producing an alloy strip laminate according to claim 20, wherein:
  the alloy strip is a nanocrystalline alloy strip, and the nanocrystalline alloy strip is prepared by performing a heat treatment for nanocrystallization in a state in which tensional force is applied to an amorphous alloy strip capable of nano crystallization, and the nanocrystalline alloy strip has a composition represented by the following Formula:

$$(Fe_{1-a}M_a)_{100-x-y-z-\alpha-\beta-\gamma}Cu_xSi_yB_zM'_\alpha M''_\beta X_\gamma (atom\ \%)$$

wherein, in the Formula, M represents at least one of Co or Ni; M' represents at least one element selected from the group consisting of Nb, Mo, Ta, Ti, Zr, Hf, V, Cr, Mn, and W; M" represents at least one element selected from the group consisting of Al, platinum group elements, Sc, rare earth elements, Zn, Sn, and Re; X represents at least one element selected from the group consisting of C, Ge, P, Ga, Sb, In, Be, and As; and a, x, y, z, a, B, and γ respectively satisfy $0 \leq a \leq 0.5$, $0.1 < x \leq 3$, $0 \leq y \leq 30$, $0 \leq z \leq 25$, $5 \leq y+z \leq 30$, $0 \leq \alpha \leq 20$, $0 < \beta \leq 20$, and $0 \leq \gamma \leq 20$.

22. The method of producing an alloy strip laminate according to claim 21, wherein the alloy strip laminate obtained by laminating the at least one second laminate on the first laminate is a long alloy strip laminate, the method further comprising, after preparing the alloy strip laminate:
  processing the long alloy strip laminate,
  winding the long alloy strip laminate into a roll shape,
  unwinding the long alloy strip laminate from the roll shape and
  cutting the unwound long alloy strip laminate.

* * * * *